United States Patent
Jin et al.

(10) Patent No.: US 10,855,988 B2
(45) Date of Patent: Dec. 1, 2020

(54) ADAPTIVE PREDICTION STRUCTURES

(71) Applicant: QUALCOMM Incorporated, San Diego, CA (US)

(72) Inventors: Guoxin Jin, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/226,594

(22) Filed: Dec. 19, 2018

(65) Prior Publication Data

US 2020/0204806 A1    Jun. 25, 2020

(51) Int. Cl.
| | |
|---|---|
| H04N 19/149 | (2014.01) |
| H04N 19/139 | (2014.01) |
| H04N 19/11 | (2014.01) |
| H04N 19/159 | (2014.01) |
| H04N 19/132 | (2014.01) |
| G06N 20/10 | (2019.01) |
| H04N 19/172 | (2014.01) |

(52) U.S. Cl.
CPC .......... *H04N 19/149* (2014.11); *G06N 20/10* (2019.01); *H04N 19/11* (2014.11); *H04N 19/132* (2014.11); *H04N 19/139* (2014.11); *H04N 19/159* (2014.11); *H04N 19/172* (2014.11)

(58) Field of Classification Search
None
See application file for complete search history.

(56) References Cited

U.S. PATENT DOCUMENTS

| | | |
|---|---|---|
| 2003/0007555 A1 | 1/2003 | Divakaran et al. |
| 2005/0036548 A1 | 2/2005 | He et al. |
| 2005/0226331 A1 | 10/2005 | Mohamed et al. |
| 2007/0274384 A1 | 11/2007 | Schwarz et al. |
| 2009/0067493 A1 | 3/2009 | Jun et al. |
| 2013/0027568 A1* | 1/2013 | Zou ...................... H04N 17/004 348/192 |

(Continued)

OTHER PUBLICATIONS

Fang et al., "Hardware oriented rate control algorithm and implementation for realtime video coding," Aug. 18, 2003, 2003 International Conference on Multimedia and Expo. ICME '03 Proceedings, IEEE.*

(Continued)

*Primary Examiner* — Edemio Navas, Jr.
(74) *Attorney, Agent, or Firm* — Polsinelli/Qualcomm

(57) ABSTRACT

Systems, methods, and computer-readable media are described for providing improved video or image encoding, including adaptive prediction structures for encoding video frames. In some examples, systems, methods, and computer-readable media can include obtaining a sequence of frames; determining, based on frame statistics associated with a first frame in the sequence of frames, a prediction structure for encoding the sequence of frames, the prediction structure defining an order in which frames in the sequence of frames are encoded and a prediction distance representing a maximum distance permitted between referencing frames and reference frames in the sequence of frames, and the frame statistics indicating an amount of motion in the first frame. The systems, methods, and computer-readable media can also include encoding one or more of the sequence of frames based on the prediction structure.

30 Claims, 17 Drawing Sheets

(56) References Cited

U.S. PATENT DOCUMENTS

| | | | |
|---|---|---|---|
| 2015/0189271 A1* | 7/2015 | Wu | H04N 19/176 375/240.02 |
| 2015/0215621 A1 | 7/2015 | Liu et al. | |
| 2015/0364158 A1 | 12/2015 | Gupte et al. | |
| 2015/0373328 A1 | 12/2015 | Yenneti et al. | |
| 2016/0037170 A1 | 2/2016 | Zhang et al. | |
| 2016/0301931 A1* | 10/2016 | Wen | H04N 19/147 |
| 2017/0142439 A1* | 5/2017 | Kobayashi | H04N 19/521 |
| 2018/0077354 A1* | 3/2018 | Ikeda | H04N 5/23254 |
| 2018/0227585 A1* | 8/2018 | Wang | H04N 19/176 |
| 2018/0310022 A1* | 10/2018 | Edpalm | H04N 19/176 |
| 2018/0332281 A1 | 11/2018 | Yu et al. | |

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages.

Fang H-C., et al., "Hardware Oriented Rate Control Algorithm and Implementation for Real Time Video Coding", Proceedings of the 2003 International Conference on Multimedia and Expo: Jul. 6-9, 2003, Baltimore Marriott Waterfront Hotel, Baltimore, Maryland, USA, IEEE Operations Center, US, Jul. 6, 2003, vol. 3, XP032963429, DOI: 10.1109/ICME.2003.1221338 ISBN: 978-0/7803-7965-7, pp. 421-424.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

"ITU-T H.265, Series H: Audiovisual and Multimedia Systems, Infrastructure of audiovisual services—Coding of moving video, High efficiency video coding," The International Telecommunication Union, Apr. 2015, 634 pp.

Mitchell J.L., et al., "Chapter 15: Rate Control in MPEG ", Oct. 31, 1996, MPEG Video Compression Standard, Chapman & Hall, New York, NY (USA), XP002687352, ISBN: 0-412-08771-5, pp. 333-356.

Rezaei M., et al., "Semi-Fuzzy Rate Controller for Variable Bit Rate Video", IEEE Transactions on Circuits and Systems for Video Technology, Institute of Electrical and Electronics Engineers, USA, May 1, 2008, vol. 18, No. 5, XP011204598, ISSN: 1051-8215, pp. 633-645.

Shih C.H., et al., "An Integrated Rate Control Scheme for TCP-Friendly MPEG-4 Video Transmission", Signal Processing, Image Communication, Elsevier Science Publishers, Amsterdam, NL, Dec. 26, 2007, vol. 23, No. 2, XP022475746, ISSN: 0923-5965, DOI: 10.1016/J.IMAGE.2007.11.003, pp. 101-115.

U.S. Appl. No. 15/940,349, filed by Yang Yu, filed Mar. 29, 2018.
U.S. Appl. No. 15/940,393, filed by Yang Yu, filed Mar. 29, 2018.

Wang P., et al., "Region-Classification-based Rate Control for Flicker Suppression of I-frames in HEVC", 2013 IEEE International Conference on Image Processing, IEEE, Sep. 15, 2013, XP032966021, DOI:10.1109/ICIP.2013.6738409 [retrieved on Feb. 11, 2014], pp. 1986-1990.

* cited by examiner

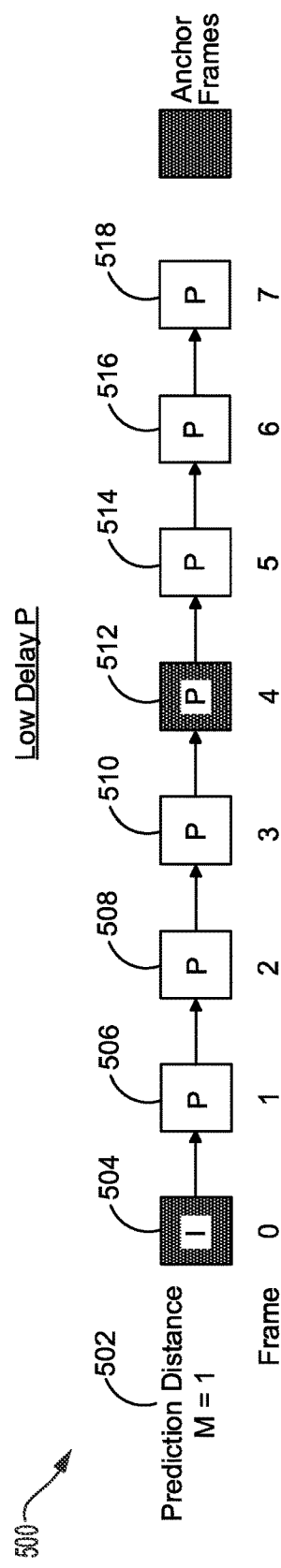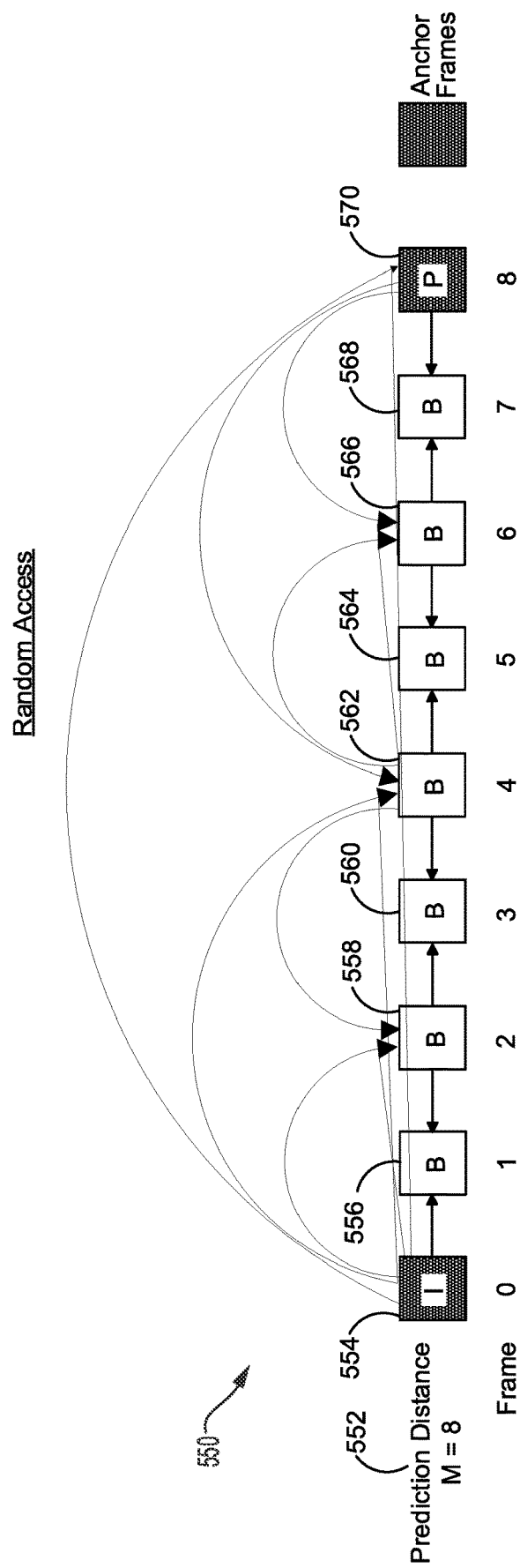
FIG. 5A
FIG. 5B

ADAPTIVE PREDICTION STRUCTURES

TECHNICAL FIELD

The present disclosure generally relates to video coding, and more specifically to adaptive prediction structures for video coding.

BACKGROUND

A wide array of devices and systems today allow video data to be processed and output for consumption. Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding standard. Example video coding standards include high-efficiency video coding (HEVC), advanced video coding (AVC), moving picture experts group (MPEG) coding, and versatile video coding (VVC). Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

BRIEF SUMMARY

The technologies described herein can provide adaptive prediction structures for coding video frames. Video coding can include encoding and/or decoding. Moreover, while specific examples herein may refer to the process and/or techniques implemented by an encoder tool, it should be noted that similar processes and/or techniques can be performed to decode data and/or can be implemented by a decoder tool.

An encoder tool encodes frames (also referred to as pictures) for storage, transmission, and/or decoding by a decoder tool. The encoder tool can partition a picture or frame into blocks of video data. The encoder tool may determine the size of the block partitioning, as well as the number of times any partitions should be further partitioned. The way a block is partitioned is referred to as a partitioning scheme.

The encoder tool can also perform predictive coding to remove or reduce redundant bits in pictures or frames, and predict information in a frame from information in other frames or regions of the same frame. For example, the prediction process can include statistical estimation of future variables from past and present observable variables. Pictures or frames typically have a number of redundant bits or pixels. Predictive coding can leverage such redundancy to predict pixels (samples) in a frame from pixels (samples) in the same frame (intra prediction) or other frames (inter prediction). Based on the predictive coding, the encoder tool can form a prediction of a block in a frame from previously-coded data in the current frame or other frames. The encoder tool can subtract the prediction from the block to form a residual or predictive error (i.e., the difference in values), which is used to code the block. In some cases, the predictive error can be can quantized and coded.

As an example, in a video compression scenario, the prediction of a pixel or a group of pixels in a frame can be derived from other pixels (e.g., within the same frame or from another frame). The predicted pixels can be subtracted from the original pixels to obtain a residual signal. Typically, the prediction is considered successful if the energy of the residual signal is lower than the energy of the original signal. Consequently, the residual pixels may be more efficiently encoded by entropy coding algorithms, and transmitted with fewer bits.

The encoder tool can select a prediction mode, such as intra prediction or inter prediction, for a block of image or video data, and a prediction structure for encoding one or more frames. A prediction structure defines the prediction mode used to encode a frame or sequence of frames, including the order in which frames in a sequence are encoded and how those frames reference other frames for prediction. The encoder tool can select from various types of prediction structures, such as, for example and without limitation, low delay P (LP), where P refers to P frames (predicted pictures) which are frames that hold the changes in the image from a previous frame; low delay B (LB), where B refers to B frames (bidirectional predicted pictures) which are frames that save additional space by using differences between the current frame and both the preceding and following frames to specify its content; hierarchical P (HP); hierarchical B (HB); random access; and the like.

The encoder tool can process various types of pictures or frames in a sequence of a video representation, such as I frames (intra-coded pictures), which hold a complete image; P frames; B frames; etc. A video representation can describe or represent any aspects and/or portions (e.g., segments) of a video, such as the format of one or more portions of the video, the sequence of frames in one or more portions of the video, the structure of one or more portions of the video, the content of frames that make up one or more portions of the video, the type(s) of frames in one or more portions of the video, the number of frames in one or more portions of the video, the configuration of one or more portions of the video, a prediction structure for one or more portions of the video, any audio and/or text (e.g., closed caption, titles, etc.) information associated with the video, video metadata, and/or any other characteristics or information associated with the video. Video representations can include various types of frames such as, for example, I frames, P frames, B frames, random access point pictures, etc. Random access point pictures can provide points at which the video representation can be switched to and from another video representation, such as a different segment or sequence of frames, a different prediction structure, etc. In another example, random access point pictures can provide points at which the video representation can be randomly accessed (e.g., when access to an earlier or later point in the video representation is requested). One example of random access point pictures includes intra random access point (IRAP) pictures, which may include instantaneous decoding refresh (IDR) pictures, clean random access (CRA) pictures, and broken link access (BLA) pictures. IDR pictures follow a closed group of picture (GOP) structure, while CRA pictures follow an open GOP structure. BLA pictures can result from splicing of bitstreams at locations of CRA pictures.

A leading picture is a picture that follows an associated TRAP picture in decoding order but is outputted earlier than the IRAP picture. Leading pictures may include random access skipped leading (RASL) pictures and random access decodable leading (RADL) pictures. RASL pictures are leading pictures that use pictures that precede the IRAP picture both in decoding order and output order as reference for inter-prediction. RADL pictures are leading pictures that do not use pictures that precede the IRAP picture both in decoding and output order as reference for inter-prediction. Both RASL pictures and RADL pictures can be used in the open GOP structure. However, in the closed GOP structure, only RADL pictures are used.

Because the characteristics of frames in a video sequence can vary, a specific type of prediction structure, such as low delay P or random access, can in many cases be more effective for encoding the frames than other prediction structures. A video sequence can often have difference scenes with widely different characteristics, which consequently may affect the performance of the predictive coding and/or rate control scheme used to encode the video sequence. For example, scene changes, different types of content such as screen content, different content statistics such as motion, and/or other characteristics can have an impact on the performance and outcome of a predictive coding and rate control scheme.

The technologies described herein can account for such variations in frame and video sequence characteristics, as well as the varying performance and outcomes of different prediction modes and structures, by intelligently and dynamically adapting the prediction modes and structures used based on the specific characteristics of frames in a video representation or sequence. By adapting the encoding prediction mode and structure based on the characteristics of frames, the technologies herein can achieve better encoding performance and rate control. The adaptive predictive encoding techniques herein can select a particular prediction mode or structure tailored to the characteristics of a frame, and dynamically switch to other prediction modes and structures when processing other frames having characteristics that are more suitable for the other prediction modes and structures.

In some examples, rather than implementing a prediction structure of a fixed size, the size of a prediction structure can be adapted based on the characteristics of frames. The size of the prediction structure can define the prediction distance used for predictions. The prediction distance can represent the maximum distance permitted between a frame being encoded and reference frames used in the sequence of frames for encoding the frame. The size or prediction distance of a prediction structure can vary from 1 to a value larger than 1. For simplicity and illustration, assume an encoder implements either short distance (SD) prediction, which in this example includes a prediction structure of size M=1, or long distance (LD) prediction, which in this example includes a prediction structure of size M>1. When implementing SD prediction, the encoder can, at any frame, determine whether to switch to LD prediction (i.e., switch to an LD prediction structure). If the encoder decides to switch to LD prediction, the encoder can also determine the optimal size or prediction distance for the LD prediction structure based on previous and/or future frame statistics such as motion and content type.

On the other hand, when implementing LD prediction, the encoder can, at any (or all) anchor frame in the LD prediction structure, determine whether to switch to SD prediction (e.g., switch to an SD prediction structure) or continue using the LD prediction structure. Various types of prediction structures can be implemented for SD or LD prediction. Non-limiting examples of prediction structures that can be implemented include low delay P structures, low delay B structures, random access, hierarchical P structures, hierarchical B structures, etc. In some implementations, the SD prediction structure and/or the LD prediction structure can be fixed. For example, in some cases, the LD prediction structure can be fixed to a size of 8 frames so the encoder can select between a random access configuration, a low delay P configuration, and/or a low delay B configuration based on content statistics.

According to at least one example, a method of encoding frames based on adaptive prediction structures is provided. The method can include obtaining a sequence of frames; determining, based on frame statistics associated with a first frame in the sequence of frames, a prediction structure for encoding the sequence of frames; and encoding one or more of the sequence of frames based on the prediction structure. In some cases, the prediction structure can define an order in which frames in the sequence of frames are encoded and a prediction distance representing a maximum distance permitted between referencing frames (e.g., current frames) and reference frames (e.g., frames referenced by the current frames) in the sequence of frames. Moreover, the frame statistics can indicate, for example, an amount of motion in the first frame, a type of content in the first frame, and/or any other characteristics of the first frame.

In another example, an apparatus is provided for encoding frames based on adaptive prediction structures. The apparatus can include memory configured to store data and one or more processors. The one or more processors can be configured to obtain a sequence of frames; determine, based on frame statistics associated with a first frame in the sequence of frames, a prediction structure for encoding the sequence of frames; and encode one or more of the sequence of frames based on the prediction structure. In some cases, the prediction structure can define an order in which frames in the sequence of frames are encoded and a prediction distance representing a maximum distance permitted between referencing frames and reference frames in the sequence of frames. Moreover, the frame statistics can indicate, for example, an amount of motion in the first frame, a type of content in the first frame, and/or any other characteristics of the first frame.

In another example, a non-transitory computer-readable medium is provided for encoding frames based on adaptive prediction structures. The non-transitory computer-readable medium can have stored thereon instructions that, when executed by one or more processors, cause the one or more processors to obtain a sequence of frames; determine, based on frame statistics associated with a first frame in the sequence of frames, a prediction structure for encoding the sequence of frames; and encode one or more of the sequence of frames based on the prediction structure. In some cases, the prediction structure can define an order in which frames in the sequence of frames are encoded and a prediction distance representing a maximum distance permitted between referencing frames and reference frames in the sequence of frames. Moreover, the frame statistics can indicate, for example, an amount of motion in the first frame, a type of content in the first frame, and/or any other characteristics of the first frame.

In another example, an apparatus is provided that includes means for encoding frames based on adaptive prediction structures. The apparatus can include means for obtaining a sequence of frames; determining, based on frame statistics associated with a first frame in the sequence of frames, a prediction structure for encoding the sequence of frames;

and encoding one or more of the sequence of frames based on the prediction structure. In some cases, the prediction structure can define an order in which frames in the sequence of frames are encoded and a prediction distance representing a maximum distance permitted between referencing frames and reference frames in the sequence of frames. Moreover, the frame statistics can indicate, for example, an amount of motion in the first frame, a type of content in the first frame, and/or any other characteristics of the first frame.

In some aspects, the method, apparatuses, and computer-readable media described above may further include obtaining an additional sequence of frames; determining, based on additional frame statistics associated with a second frame in the additional sequence of frames, a different prediction structure for encoding the additional sequence of frames; and encoding one or more of the additional sequence of frames based on the different prediction structure. The different prediction structure can define a different order in which frames in the additional sequence of frames are encoded and a different prediction distance representing a different maximum distance permitted between referencing frames and reference frames in the additional sequence of frames. Moreover, the additional frame statistics can indicate an amount of motion in the second frame, a type of content in the second frame, and/or any other characteristics of the second frame.

In some aspects, the different prediction distance of the different prediction structure may be smaller than the prediction distance of the prediction structure associated with the first frame when the amount of motion in the second frame is greater than the amount of motion in the first frame, and vice versa. Similarly, the different prediction distance of the different prediction structure may be larger than the prediction distance of the prediction structure associated with the first frame when the amount of motion in the second frame is less than the amount of motion in the first frame, and vice versa.

In some aspects, determining the prediction structure can include calculating a first feature vector representing the amount of motion in the first frame and, based on the first feature vector, determining, using a classifier, the prediction structure for encoding the sequence of frames and/or a respective size of the prediction distance of the prediction structure. Similarly, in some aspects, determining the different prediction structure can include calculating a second feature vector representing the respective amount of motion in the second frame and, based on the second feature vector, determining, using the classifier, the different prediction structure for encoding the additional sequence of frames and/or a respective size of the different prediction distance. In some cases, the classifier can include a linear classifier or a decision tree classifier.

The first and second feature vectors can be calculated based on, for example, respective motion vectors computed for the first frame and the second frame, respective intra ratios computed for the first frame and the second frame, respective skip ratios computed for the first frame and the second frame, one or more weight values, and/or one or more bias values. The motion vector computed for the first frame can be calculated at least partly by averaging motion vectors calculated for blocks in the first frame, and the motion vector computed for the second frame can be calculated at least partly by averaging motion vectors calculated for blocks in the second frame.

Moreover, in some cases, the intra ratio associated with the first frame can include a percentage of pixels coded in the first frame by intra prediction and the intra ratio associated with the second frame can include a percentage of pixels coded in the second frame by intra prediction. Further, in some cases, the skip ratio associated with the first frame can include a percentage of pixels coded by skip mode from among the pixels coded in the first frame by intra prediction, and the skip ratio associated with the second frame can include a percentage of pixels coded by skip mode from among the pixels coded in the second frame by intra prediction.

In some aspects, the encoding of the one or more of the sequence of frames is further based on one or more rate control models selected for the one or more of the sequence of frames. The one or more rate control models can include, for example, a q-domain model, a p-domain model, and/or a λ-domain model. In some examples, different rate control models can be selected and applied for different prediction structures and/or different temporal level frames.

In some aspects, the method, apparatuses, and computer-readable media described above may further include calculating a training feature vector for at least one frame in a sample sequence of frames; adjusting, based on an accuracy or error associated with the training feature vector, a weight and/or a bias used to calculate the training feature vector; generating a trained weight and/or a trained bias based on the adjusted weight and/or the adjusted bias; and using the trained weight and/or the trained bias to determine a weight and/or bias used to calculate the first feature vector and/or the second feature vector.

In some examples, determining the prediction structure associated with the sequence of frames can include selecting, based on multi-frame statistics associated with multiple frames in the sequence of frames, a prediction mode for encoding operations associated with the sequence of frames. The multi-frame statistics can include a respective amount of motion calculated for each of the multiple frames. The prediction mode can include a short prediction mode or a long prediction mode. Moreover, in some cases, the short prediction mode is selected when the multi-frame statistics indicate that the amount of motion in the multiple frames is below a threshold and/or a type of content in one or more of the multiple frames includes screen content, and the long prediction mode is selected when the multi-frame statistics indicate that the amount of motion in the multiple frames is above the threshold.

In some examples, the short prediction mode can include a prediction mode implementing a short distance prediction structure (e.g., a prediction structure having a prediction distance or size below a threshold), and the long prediction mode can include a prediction mode implementing a long distance prediction structure (e.g., a prediction structure having a prediction distance or size above a threshold).

In some aspects, the method, apparatuses, and computer-readable media described above may further include processing the first frame at a content classifier and determining, based on an output from the content classifier, whether the content in the first frame includes screen content. Moreover, in some examples, determining the prediction structure associated with the sequence of frames can include selecting a short prediction mode when the amount of motion in the first frame is below a threshold or a content in the first frame includes screen content, and selecting a long prediction mode is selected when the amount of motion in the first frame is above the threshold.

In some aspects, the method, apparatuses, and computer-readable media described above may further include determining, when processing at least one frame in the sequence of frames, whether to switch from a short prediction mode to a long prediction mode and change the prediction structure to a long distance prediction structure having a longer prediction distance than the prediction structure; and in response to determining to switch to the long prediction mode and change the prediction structure to the long distance prediction structure, encoding the at least one frame based on the long prediction mode and the long distance prediction structure.

In other aspects, the method, apparatuses, and computer-readable media described above may further include determining, for each anchor frame in the sequence of frames that is processed while a long prediction mode is selected, whether to switch to a short prediction mode and a short distance predication structure having a shorter prediction distance than the prediction structure; and in response to determining to switch to the short prediction mode and change the prediction structure to the short distance prediction structure, encoding at least one frame from the sequence of frames based on the short prediction mode and the short distance prediction structure.

In some aspects, the apparatuses described above can include mobile devices, displays for displaying one or more frames, and/or encoding devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIGS. 5A and 5B illustrate example prediction structures for predictive encoding, in accordance with some examples;

DETAILED DESCRIPTION

Figure 1:
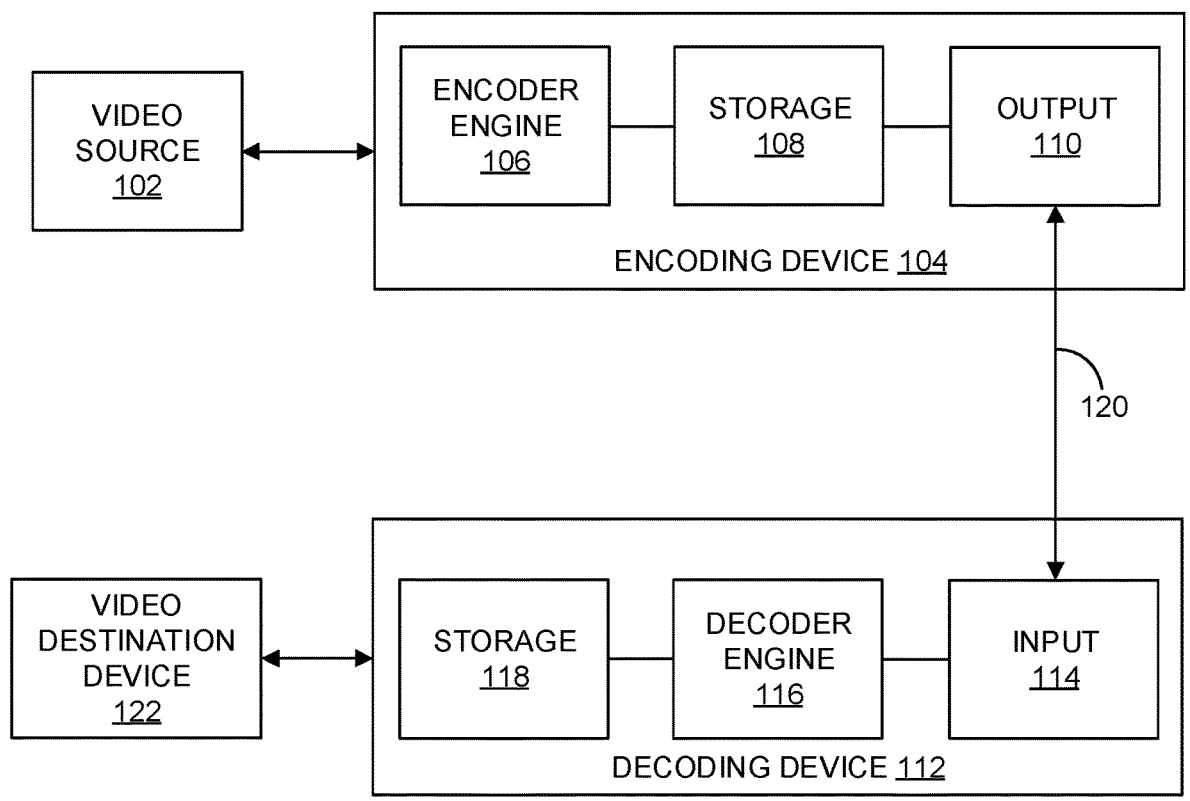
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the various tasks (e.g., a computer-program product) may be stored in a computer-readable or machine-readable medium. A processor(s) may perform the various tasks.

As more devices and systems provide consumers with the ability to consume digital video and image data, the need for efficient encoding techniques becomes more important. Encoding is used at least in part to reduce storage and transmission requirements to handle the large amounts of data present in digital frames (e.g., video and/or image data). Various encoding techniques may be used to compress data into a form that uses a lower bit rate while maintaining high video or image quality.

Figure 12:
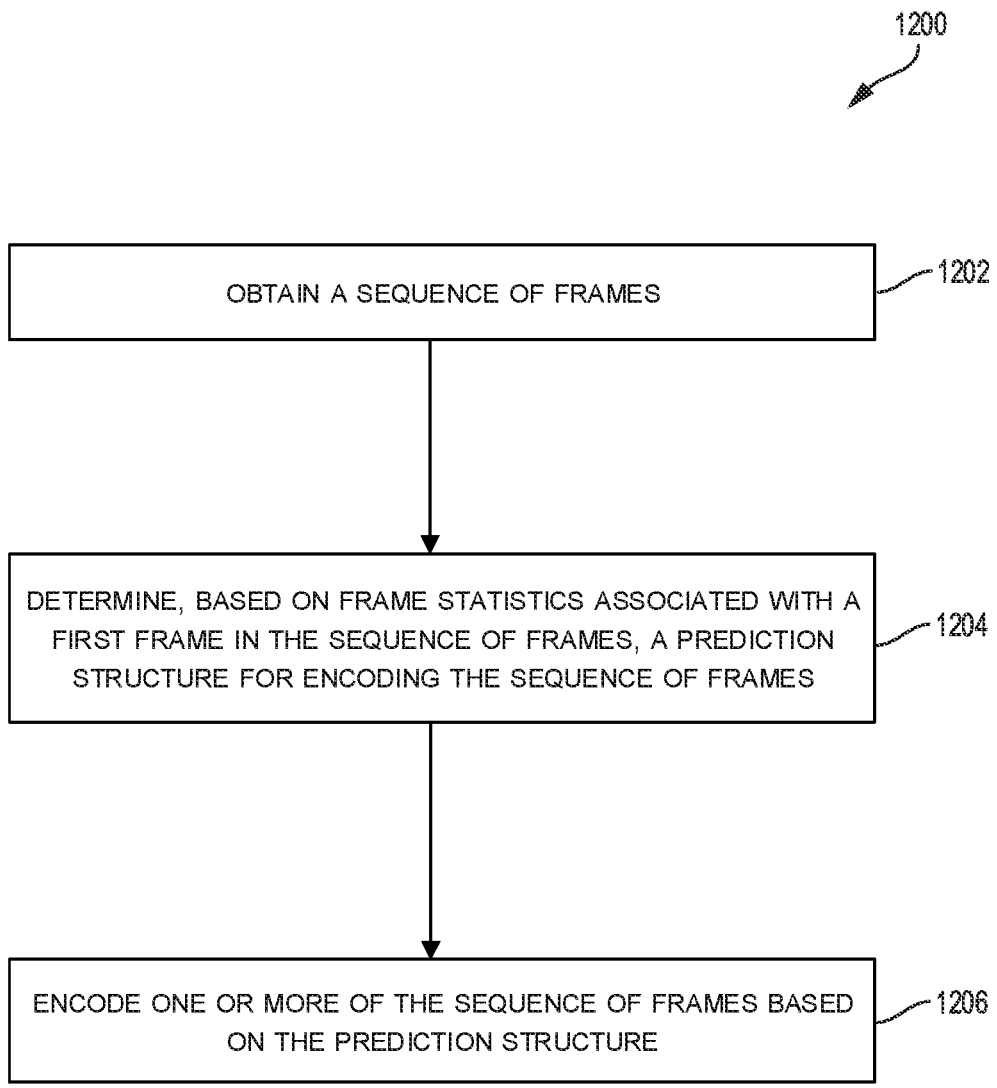
FIG. 12 illustrates an example method for encoding frames based on adaptive prediction structures, in accordance with some examples.
Figure 13:
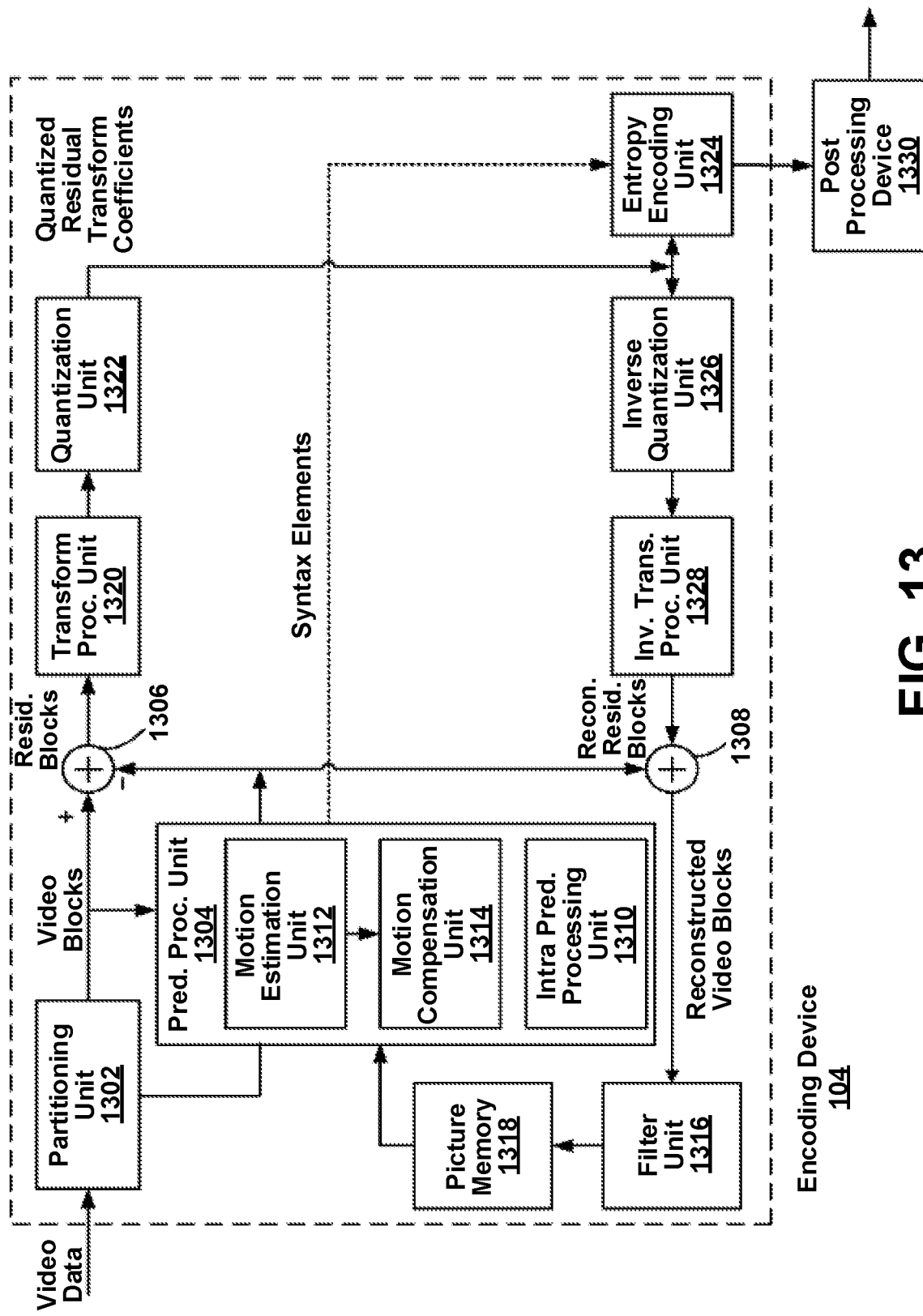
FIG. 13 is a block diagram illustrating an example video encoding device, in accordance with some examples.
Figure 14:
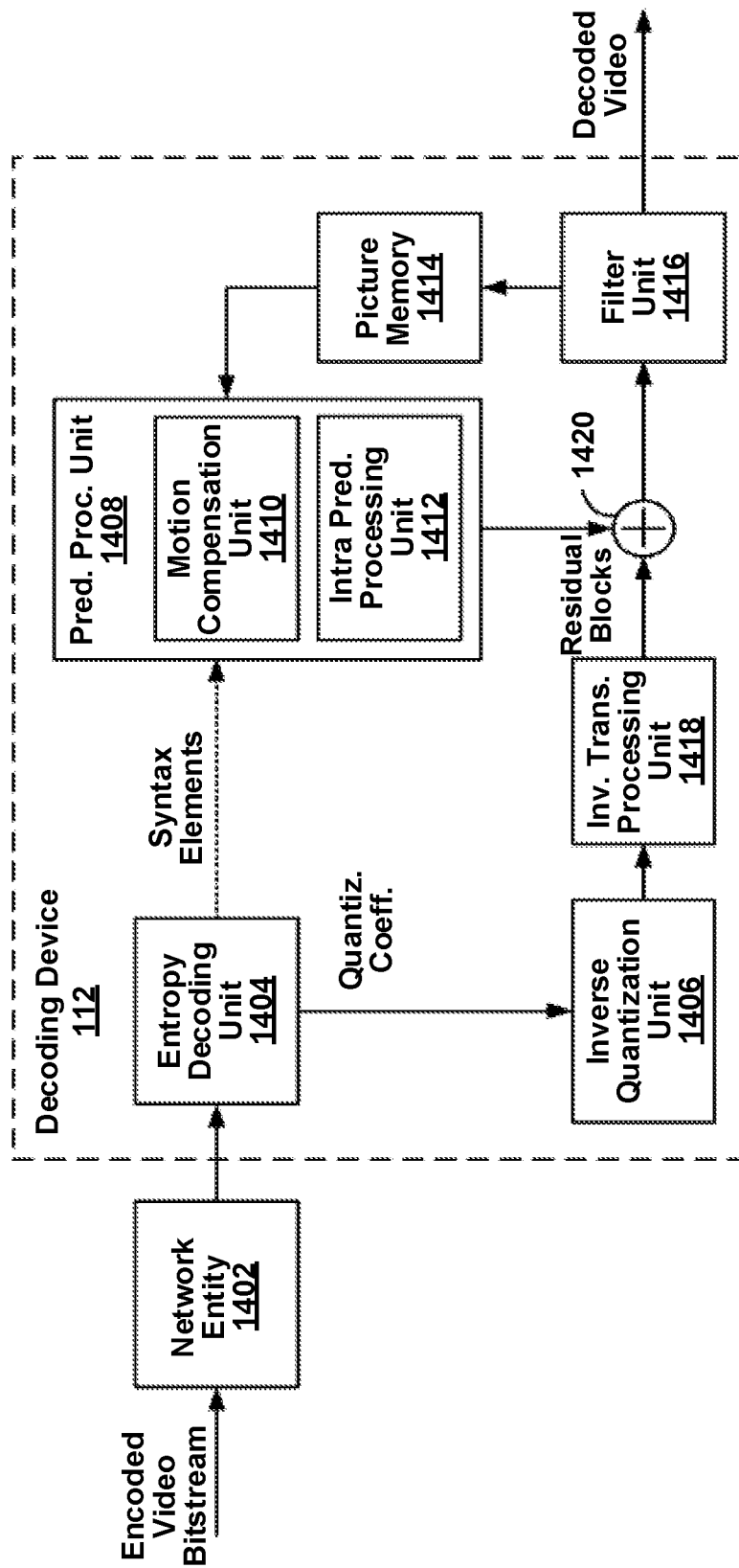
FIG. 14 is a block diagram illustrating an example video decoding device, in accordance with some examples.

The technologies described herein can provide adaptive prediction structures for encoding video frames. In some examples, one or more apparatuses and methods are described for generating and implementing adaptive prediction structures for encoding video frames. The disclosed technology will be described in more detail in the following disclosure. The discussion begins with a description of example systems, architectures, and strategies for selecting and implementing adaptive prediction structures to encode video frames, as shown in FIGS. 1 through 11. A description of an example method for encoding frames based on adaptive prediction structures, as illustrated in FIG. 12, will then follow. The discussion concludes with a description of example video encoding and decoding devices, as illustrated in FIGS. 13 and 14. The disclosure now turns to FIG. 1.

FIG. 1 is a block diagram illustrating an example of a system 100 including an encoding device 104 and a decoding device 112. In some examples, the encoding device 104 and the decoding device 112 may be part of a same device. In other examples, the encoding device 104 and the decoding device 112 may be part of different devices. For example, in some cases, the encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a smart wearable device, or any other suitable electronic device. In some examples, the source device and the receiving device may include one or more wireless transceivers for wireless communications.

The coding techniques described herein are applicable to various multimedia applications, including streaming video transmissions (e.g., over the Internet), television broadcasts or transmissions, encoding of digital video for storage on a data storage medium, or other applications. In some examples, system 100 can support one-way or two-way video transmission for applications such as video conferencing, video streaming, video playback, video broadcasting, gaming, video telephony, etc.

The encoding device 104 (or encoder) can be used to encode video data to generate an encoded video bitstream. In some examples, the encoding device 104 can encode video data using a video coding standard or protocol. Example video coding standards include ITU-T H.261; ISO/IEC MPEG-1 Visual; ITU-T H.262 or ISO/IEC MPEG-2 Visual; ITU-T H.263; High-Efficiency Video Coding (HEVC); ISO/IEC MPEG-4 Visual and ITU-T H.264 (also known as ISO/IEC MPEG-4 AVC), including its Scalable Video Coding (SVC) and Multiview Video Coding (MVC) extensions. Various extensions to HEVC deal with multi-layer video coding and have been (or are being) developed, including the multiview extension to HEVC called MV-HEVC, the scalable extension to HEVC called SHVC, or any other suitable coding protocol.

Many aspects described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of a source device or may be part of a device other than the source device. The video source 102 may include a video capture device (e.g., a video camera, a camera phone, a video phone, a video sensor, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) can include a series of access units (AUs) starting with an AU.

An access unit (AU) can include one or more coded pictures and control information corresponding to the coded pictures that share the same output time. Coded slices of pictures can be encapsulated in the bitstream level into data units called network abstraction layer (NAL) units. For example, an HEVC video bitstream may include one or more CVSs including NAL units. Each of the NAL units has a NAL unit header. The syntax elements in the NAL unit header take the designated bits and therefore are visible to various systems and transport layers, such as Transport Stream, Real-time Transport (RTP) Protocol, File Format, among others.

Various classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice can be independent of other slices so that information in the slice is coded without dependency on data from other slices within the same picture. A slice includes one or more slice segments including an independent slice segment and, if present, one or more dependent slice segments that depend on previous slice segments. The slices are partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. For intra-block copy prediction, a set of motion parameters (e.g., one or more block vectors, or the like) can also be signaled for each PU and can be used for intra-block copy prediction. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. Syntax data associated with a CU may describe, for example, partition-ing of the CU into one or more PUs. Syntax data associated with a CU may also describe, for example, partitioning of the CU into one or more TUs according to a CTU.

In some cases, transformations may be performed using transform units (TUs). The TUs may be the same size or smaller than the PUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode as further described herein. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Moreover, the prediction mode can be adaptive and may include short distance prediction, which can be based on a specific short distance prediction structure, or long distance prediction, which can be based on a specific long distance prediction structure, as further described herein.

Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU or block level.

In some examples, the one or more slices of a picture can be assigned a slice type. Slice types can include an I slice, a P slice, and a B slice. An I slice (intra-frames, independently decodable) is a slice of a picture that is only coded by Intra prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block.

Intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously-decoded picture (a reference picture) can be indicated by a motion vector specifying the horizontal displacement and the vertical displacement of the reference block relative to the position of the current block. The previously decoded reference picture can be indicated by a reference index (refIdx) to a reference picture list. The motion vectors and reference indices can be referred to as motion parameters.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU and/or a prediction structure (e.g., short distance prediction structure, long distance prediction structure) used for encoding the PU. The data defining the motion vector and/or the prediction structure for a PU may describe, for example, a horizontal and/or vertical component of the motion vector, a resolution for the motion vector, one or more reference pictures to which the motion vector points, one or more reference indexes, a reference picture list for the motion vector, characteristics of the prediction structure (e.g., prediction order, prediction distance, etc.), or any combination thereof.

The encoding device 104 may then perform transformation and quantization. For example, following prediction, the encoder engine 106 may calculate residual values corresponding to the PU. Residual values may be pixel difference values between the current block of pixels being coded (the PU) and the prediction block(s) used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block.

Any residual data that may be remaining after prediction is performed can be transformed using a block transform, which may be based on discrete cosine transform, discrete sine transform, an integer transform, a wavelet transform, other suitable transform function, or any combination thereof. In some cases, one or more block transforms may be applied to residual data in each CU. In some cases, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may be pixel data in the spatial domain (or pixel domain). The TUs may be coefficients in the transform domain following application of a block transform. The residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. Once quantization is performed, the coded video bitstream includes quantized transform coefficients, prediction information (e.g., prediction modes, motion vectors, block vectors, or the like), partitioning information, and/or any other suitable data, such as other syntax data. The different elements of the coded video bitstream may be entropy encoded by the encoder engine 106.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, a wired and/or wireless communications medium, or any combination thereof. The encoded video bitstream data may be modulated according to a communication standard, such as a wireless communication protocol, and transmitted to the receiving device.

In some examples, the encoding device 104 may store encoded video bitstream data in storage 108. The output 110 may obtain the encoded video bitstream data from the encoder engine 106 or from the storage 108. Storage 108 may include any of a variety of physical and/or virtual/logical storage, distributed storage media, locally accessed data storage media, etc. For example, the storage 108 may include a hard drive, a storage disc, flash memory, volatile or non-volatile memory, a distributed storage system, a logical volume or disk, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some cases, the video encoding device 104 and/or the video decoding device 112 may be integrated with an audio encoding device and audio decoding device, respectively. The video encoding device 104 and/or the video decoding device 112 may also include other hardware or software to implement the coding techniques described herein, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (e.g., a codec) in a respective device. An example of specific details of the encoding device 104 is described below with reference to FIG. 13. An example of specific details of the decoding device 112 is described below with reference to FIG. 14.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . , n). The base layer may conform to a profile of the first version of HEVC, and represents the lowest available layer in a bitstream. The enhancement layers can have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

Figure 2:
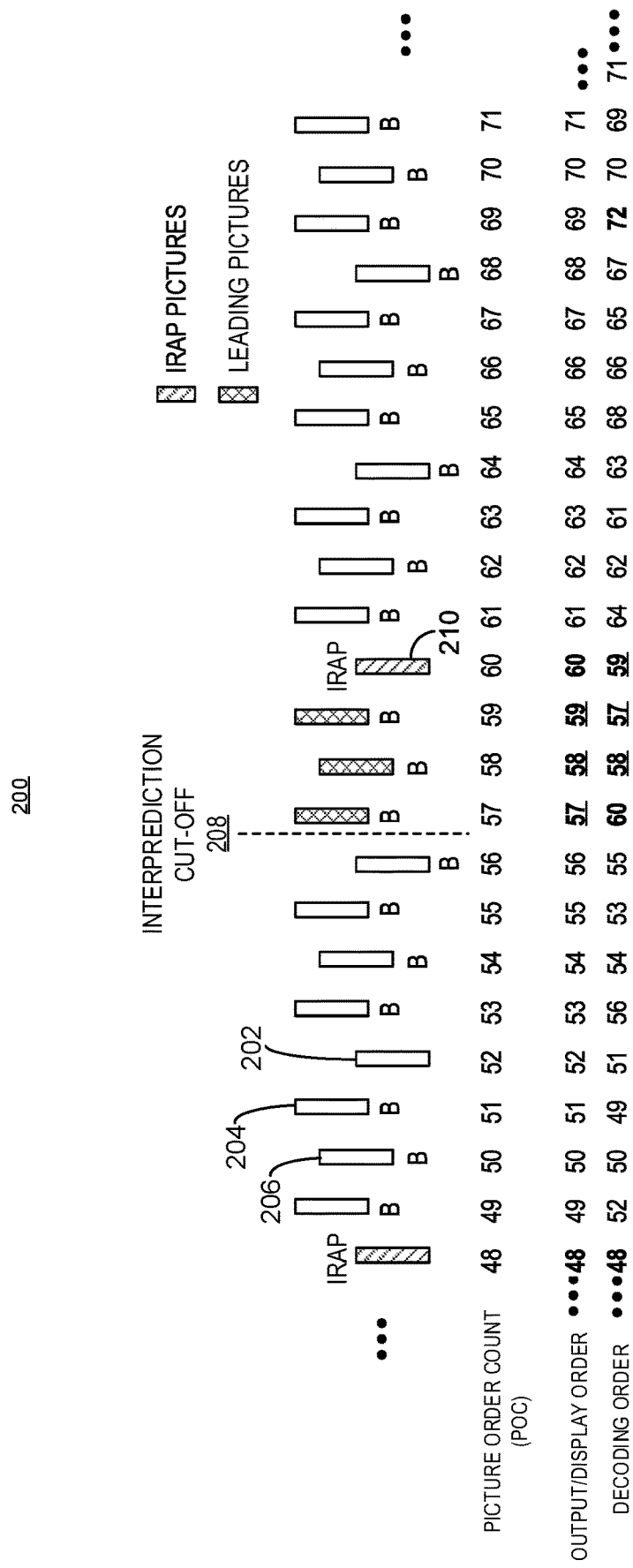
FIG. 2 is an example of pictures in a closed group of pictures (GOP) structure, in accordance with some examples.
Figure 3:
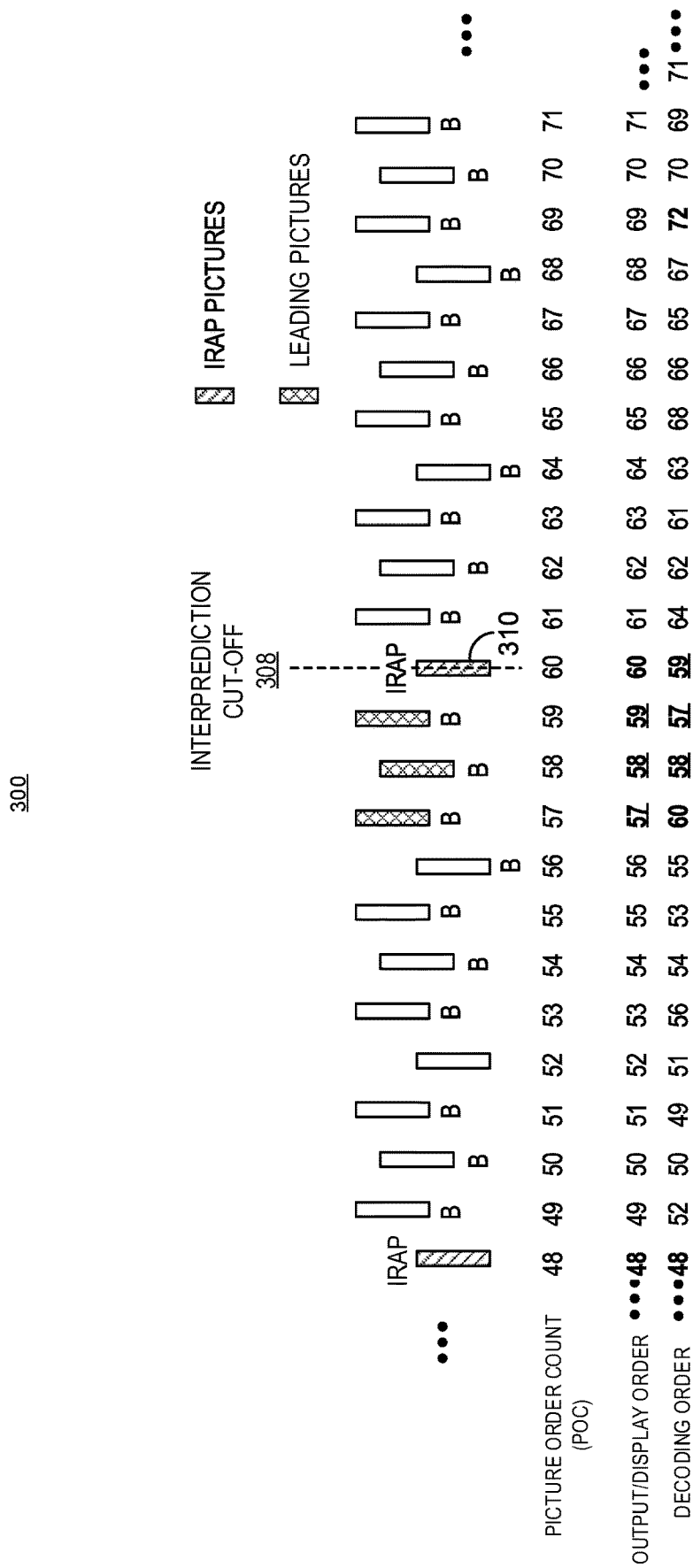
FIG. 3 is an example of pictures in an open GOP structure, in accordance with some examples.

FIG. 2 illustrates an example of pictures in a video bitstream 200 arranged in output order (also referred to as display order). The bitstream 200 includes three temporal sub-layers, with the height of each picture indicating the temporal sub-layer for which the picture belongs. For example, the bottom pictures (pictures 48, 52, 56, 60, 64, and 68) belong to the base temporal sub-layer (with TemporalId=0). The middle pictures (pictures 50, 54, 58, 62, 66, and 70) belong to the second temporal sub-layer (with TemporalId=1). The top pictures (pictures 49, 51, 53, 55, 57, 59, 61, 63, 65, 67, 69, and 71) belong to the third temporal sub-layer (with TemporalId=2). FIG. 3 shows another example of a video bitstream 300 with three temporal sub-layers.

A constraint is defined that enables temporal scalability work. The constraint indicates that a higher temporal sub-layer can use the pictures from lower temporal sub-layers for inter-prediction (with a lower TemporalId), but the lower temporal sub-layers may not refer to any picture from a higher temporal sub-layer for inter-prediction (with a higher TemporalId). Due to the constraint, pictures with a TemporalId up to a particular value can be decoded without referring to any picture with a greater TemporalId value. Using the video bitstream 200 shown in FIG. 2 as an example, picture 52 is part of the base temporal sub-layer 0, and thus can only use the IRAP picture 48 as reference because the other earlier pictures are all part of higher temporal sub-layers. Similarly, picture 56 can use picture 52 and/or picture 48 as reference for inter-prediction, but cannot use other pictures that are earlier in decoding order.

The temporal sub-layers can be scaled up and down to provide different video frame rates. In one illustrative example, the base temporal sub-layer 0 is at a frame rate of 30 fps, the second temporal sub-layer 1 is at a frame rate of 60 fps, and the third temporal sub-layer 2 is at a frame rate of 120 fps. In this example, when all pictures are decoded and output by a media player, the highest frame rate of 120 fps is achieved. In another example, a media player may decode and output the pictures of the base sub-layer 0 and the second sub-layer 1, providing output video at a frame rate of 60 fps.

Figure 4:
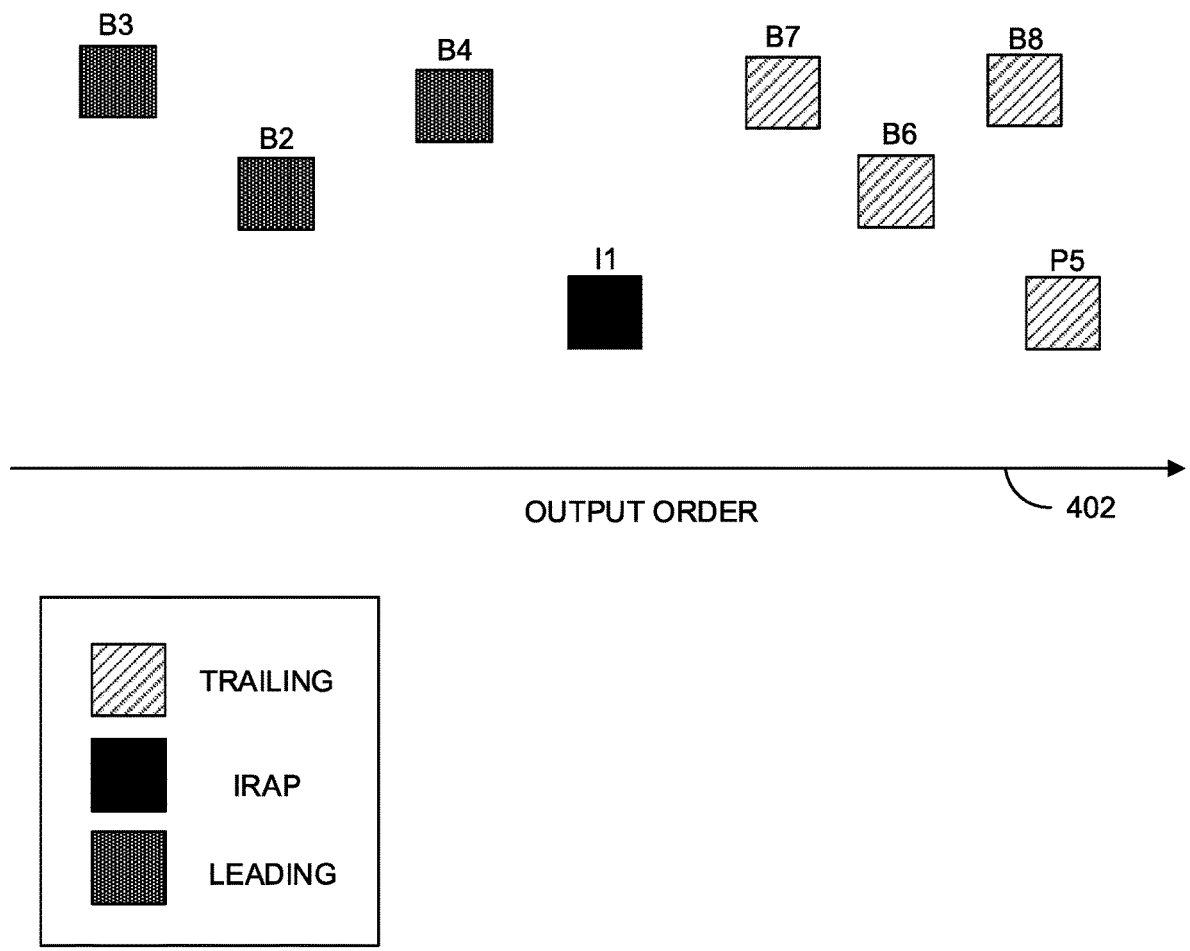
FIG. 4 is an example of pictures of an encoded video bitstream, in accordance with some examples.

Random access and stream switching can be enabled by the use of intra-random access point (IRAP) pictures. IRAP pictures include, for example, IDR pictures, CRA pictures, and BLA pictures. FIG. 4 is an example of pictures of an encoded video bitstream including an IRAP picture I1 and leading and trailing pictures associated with the IRAP picture I1. The pictures are linearly displayed in output order in the direction of the arrow 402, and the numbers 1-8 (I1, B2, B3, B4, P5, B6, B7, B8) indicate the decoding order of the pictures. IRAP pictures provide points in a bitstream where decoding can begin.

Pictures B2, B3, and B4 include leading pictures of the TRAP picture I1. A leading picture is a picture that follows an IRAP picture in decoding order, but precedes the IRAP picture in output order. As illustrated in FIG. 4, leading pictures B2, B3, and B4 are after TRAP picture I1 in decoding order, and come before the IRAP picture I1 in output order.

Pictures P5, B6, B7, and B8 include trailing pictures of the TRAP picture I1. A trailing picture is a picture that follows an TRAP picture in decoding order and in output order. As illustrated in FIG. 4, trailing pictures P5, B6, B7, and B8 follow the TRAP picture I1 in decoding order and also in output order.

Leading pictures and trailing pictures are associated with the closest IRAP picture in decoding order (picture I1 in FIG. 4). In some cases, the decoding order of an TRAP picture and its associated trailing and leading pictures is defined based on certain conditions on leading and trailing pictures. Trailing pictures associated with an IRAP picture do not depend on any leading pictures, and do not depend on any trailing pictures of previous IRAP pictures. Leading pictures associated with an TRAP picture precede trailing pictures (in decoding order) that are associated with the same TRAP picture. Based on these conditions, and similar other conditions that are not listed here, the decoding order of the IRAP picture I1 and its associated trailing and leading pictures is the TRAP picture I1, followed by the leading pictures B2, B3, B4, followed by the trailing pictures P5, B6, B7, B8.

TRAP pictures follow an open group of picture (GOP) structure or a closed GOP structure. In some cases, IDR pictures follow the closed group of picture (GOP) structure, and CRA pictures follow the open GOP structures. Returning to FIG. 2 and FIG. 3, the difference of IRAP pictures in closed GOP and open GOP structures is illustrated, where the output order and decoding order of each picture are given. FIG. 2 shows TRAP pictures in a closed GOP structure, and FIG. 3 shows IRAP pictures in an open GOP structure. In FIG. 2, the picture 202 with a picture order count (POC) value of 52 follows the picture 204 with a POC value of 51 in output order, meaning that the picture 204 with POC 51 shall be output earlier than the picture 202 with POC value 52. A POC for a picture can be thought of as a unique number assigned for identifying each picture in the bitstream. Further, the picture 202 with POC value 52 precedes, in decoding order, the picture 206 with POC value 50, meaning that the picture 202 with POC value 52 shall be decoded earlier than the picture 206 with POC value 50.

Generally, a picture may use pictures that are decoded earlier as its reference for inter-prediction. For random access to a certain point in a video bitstream, to enable starting of a decoding process from an IRAP picture, there is an inter-prediction cut-off Pictures after the inter-prediction cut-off point may not use any picture decoded before the inter-prediction cut-off point as reference. The inter-prediction cut-off point 208 in the closed GOP structure is illustrated in FIG. 2 and the inter-prediction cut-off point 308 in the open GOP structure is illustrated in FIG. 3. Pictures that are in the right hand side of the inter-prediction cut-off points 208 and 308 do not use pictures in the left hand side of the cut-off points 208 and 308 as reference for inter-prediction. As described above, leading pictures follow an associated TRAP picture in decoding order, but are output earlier than the IRAP picture. As shown in FIG. 2, the pictures with POC values 57, 58 and 59 are leading pictures associated with the IRAP picture 210 (with POC value 60). In the closed GOP structure (FIG. 2), the leading pictures associated with the TRAP picture 210 do not use pictures that precede the TRAP picture 210 both in decoding and output order (the pictures to the left of the inter-prediction cut-off line 208, which are the pictures with a POC value 56 or less) as reference for inter-prediction.

In an open GOP structure, as shown in FIG. 3, the inter-prediction cut-off point 308 lies on the IRAP picture 310 (with POC value 60). Pictures on the left hand side of the TRAP picture 310 and that follow the TRAP picture in decoding order (the leading pictures with POC values 57, 58, and 59) can still use the TRAP picture 310 as reference for inter-prediction, while pictures on the right hand side of the TRAP picture 302 can also use the TRAP picture 310 as reference for inter-prediction, but cannot use pictures on the left hand side of the TRAP picture 310 as reference. The difference between inter-prediction of leading pictures in closed and open GOP can be seen from the inter-prediction cut-off points 208 and 308 in FIG. 2 and FIG. 3. For example, in the open GOP case of FIG. 3, the leading pictures (POC values 57, 58, 59) can refer to pictures that are earlier in decoding order (and output order) than their associated IRAP picture 310, but this is not allowed in the closed GOP case of FIG. 2.

As previously noted, when encoding a sequence of frames, the encoding device 104 can implement a prediction structure for the prediction process. The prediction structure specifies the order that frames in a sequence are encoded and how other frames in the sequence are referenced for prediction. The prediction structure can adaptively change as described herein based on the characteristics of the sequence of frames and/or one or more frames in the sequence of frames.

FIGS. 5A and 5B illustrate example prediction structures that can be implemented for use in the prediction and encoding process. With reference to FIG. 5A, example prediction structure 500 is a low delay P (LP) prediction structure that can be used to encode a sequence of frames including frames 0 through 7 (frames 504-518). Frame 0 (504) is an I frame (intra-coded picture) and contains the entire image data for that frame. Frames 1 through 7 (506-518) are P frames (predicted pictures) which contain only the changes in the image from their respective previous frame. For example, frame 1 (506) includes the changes in the image from the previous frame, which in this example is frame 0 (504); frame 2 (508) includes the changes in the image from the previous frame, which in this example is frame 1 (506); frame 3 (510) includes the changes in the image from the previous frame, which in this example is frame 2 (508); and so forth.

In addition, frame 0 (504) and frame 4 (512) in this example are designated anchor frames in the sequence of frames 0 through 7 (504-518). Anchor frames can be used to encode other frames. Anchor frames are generally encoded with a high quality and accuracy (e.g., based on the entire image), and can provide high quality predictions (and prediction information such as content statistics) with low distortion for other frames. Therefore, the encoded anchor frames and associated frame statistics (e.g., motion statistics and prediction parameters) can be used for predictive coding of other frames. The high quality and low distortion typically associated with anchor frames can propagate to the prediction and/or coding results of frames that use the anchor frames for their respective predictive coding, as they utilize the high quality and low distortion encoding and information reflected in the anchor frames. For example, frame 0 (504), which is an anchor frame, can be encoded and its frame statistics, such as motion statistics, can be used for the predictive coding of frames 1 through 3 (506, 508, and 510). Similarly, frame 4 (512), which is also an anchor frame, can be encoded and its frame statistics used for the predictive coding of frames 5 through 7 (514, 516, and 518).

In some cases, anchor frames can also provide a place within the sequence of frames (i.e., frames 0 through 7) for obtaining new frame statistics, such as motion statistics, and determining whether to switch to a different prediction structure. For example, at frame 0 (504), which is the first anchor frame in the sequence of frames 0-7 (504-518), the encoding device 104 can obtain frame statistics based on the content of frame 0 (504). The encoding device 104 can then use the frame statistics from frame 0 (504) to determine a prediction structure (e.g., 500) for the sequence of frames 504-518 (or determine whether to switch from a prediction structure used for a previous sequence of frames) and for the prediction of frames 1 through 3 (506-510). At frame 4 (512), which is the next anchor frame in the sequence of frames 0-7 (504-518), the encoding device 104 can obtain new or additional frame statistics based on the content of frame 4 (512). The encoding device 104 can then use the frame statistics from frame 4 (512) to determine whether to switch from the prediction structure calculated at frame 0 (504) to a different prediction structure that is estimated to be more suitable for frame 4 (512) and/or the remaining frames 5 through 7 (514-518) in the sequence. The encoding device 104 can also use the frame statistics from frame 4 (512) for the prediction of frames 5 through 7 (514-518).

In other cases, the encoding device 104 may determine whether to switch to a different prediction structure at one or more non-anchor frames. For example, the encoding device 104 may compute frame statistics at one or more non-anchor frames (e.g., any of frames 506-510 and 514-518) and use the computed frame statistics to determine whether to switch to a different prediction structure. To illustrate, the encoding device 104 may compute frame statistics at frame 2 (508) and use those computed frame statistics to determine whether to switch to a different prediction structure from the one identified at the previous anchor frame (i.e., frame 0). As will be further described below, a decision to switch to a different prediction structure can be based on a type of content in one or more frames, such as screen content or any other type of content that may have a threshold impact on the prediction of other frames; a change in the amount of motion in one or more frames, such as a change in motion resulting from a frame with fairly static content being followed by a frame with content having rapid or frequent changes in motion and vice versa; etc.

The prediction structure 500 in FIG. 5A has a prediction distance 502 of size M=1 configured for the sequence of frames (i.e., frames 0 through 7). The prediction distance 502, M=1, can represent a maximum distance permitted between referencing frames and reference frames in the sequence of frames (i.e., frames 0 through 7). In other words, the prediction distance 502 defines how far out (e.g., how many frames away) a current frame can go when referencing another frame(s) for predictive coding. For example, as previously noted, the prediction distance 502 of the prediction structure 500 is set to M=1, where M is the maximum distance in frames from the current frame (and/or before the current frame in the case of bidirectional predictions as shown in FIG. 5B) that can be used by the current frame when referencing other frames.

To illustrate, since M=1 in the prediction structure 500 and frames 1 through 7 (506-518) in the sequence are P frames (predicted frames or pictures), frame 1 (506) in the sequence can only reference frame 0 (504), which is 1 frame behind frame 1 (506); frame 2 (508) in turn can only reference frame 1 (506), which is 1 frame behind frame 2 (508); and so forth. If frames 1 (506) and 2 (508) were otherwise B frames (e.g., in a bidirectional prediction context), then frame 1 (506) could also reference frame 2 (508) and frame 2 could also reference frame 3 (510). As another example, if the size of the prediction distance 502 was instead M=2, then a current frame in the sequence would be able to reference up to 2 frames behind the current frame. An example of a larger prediction distance is further described below with reference to FIG. 5B.

As previously noted, the prediction structure 500 can define the order in which frames are encoded. The order can depend on the prediction distance 502 and the types of frames in the prediction structure 500, which determine the order in which frames 0 through 7 (504-518) in the sequence are encoded. For example, the types of frames (e.g., I frames, P frames, B frames) in the sequence (e.g., frames 0 through 7) dictate the directionality of references and/or predictions (e.g., preceding frames in the case of P frames, preceding and following frames in the case of B frames, current frame in the case of I frames) and the prediction distance 502 dictates the maximum distance between a current frame and a reference frame as previously explained.

With reference to FIG. 5B, example prediction structure 550 is a random access (RA) prediction structure that can be used to encode a sequence of frames including frames 0 through 8 (frames 554-570). Frame 0 (554) is an I frame (intra-coded picture) and contains the entire image data for that frame. Frames 1 through 7 (556-568) are B frames (bidirectional pictures), which use the differences between the current frame and both the preceding and following frames to determine its content. Frame 8 (570) is a P frame (predicted picture), which holds only the changes in the image from previous frame(s).

For example, frame 1 (556) uses the differences between frame 1 (556) and both frame 0 (554) and frame 2 (558) to determine its content, frame 2 (558) uses the differences between frame 2 (558) and both frame 0 (554) and frame 4 (562) to determine its content, frame 3 (560) uses the differences between frame 3 (560) and both frame 2 (558) and frame 4 (562) to determine its content, frame 4 (562) uses the differences between frame 4 (562) and both frame 0 (554) and frame 8 (570) to determine its content, frame 5 (564) uses the differences between frame 5 (564) and both frame 4 (562) and frame 6 (566) to determine its content, frame 6 (566) uses the differences between frame 6 (566) and both frame 4 (562) and frame 8 (570) to determine its content, and frame 7 (568) uses the differences between frame 7 (568) and both frame 6 (566) and frame 8 (570) to determine its content. On the other hand, frame 8 (570) is a P frame and holds the changes in the image from previous frame 0 (554).

In addition, frame 0 (554) and frame 8 (570) in this example are anchor frames. Thus, frame 0 (554) and frame 8 (570) in the sequence of frames 0 through 8 (554-570) can not only be used to predict and encode other frames, but can also be used to determine whether to determine a prediction structure (e.g., 550) for the sequence of frames 0 through 8 (554-570) or determine whether to switch from a current prediction structure to a different prediction structure. For example, frame 0 (554), which is an anchor frame, can be encoded and its frame statistics used not only to encode other frames but also to determine the prediction structure 550 for the sequence of frames 0 through 8 (554-570). Frame 8 (570), which is also an anchor frame, can be encoded and its frame statistics used to determine whether to switch from the prediction structure 550 to a different prediction structure (e.g., 500).

As previously explained, in some cases, one or more non-anchor frames can also be used to determine whether to switch from a current prediction structure (e.g., 550) to a different prediction structure (e.g., 500). For example, at frame 0 (554), which is the first anchor frame in the sequence of frames 0-8 (554-570), the encoding device 104 can obtain frame statistics based on the content of frame 0 (554). The encoding device 104 can then use the frame statistics from frame 0 (554) to determine a prediction structure (e.g., 500) for the sequence of frames 0 through 8 (554-570) or determine whether to switch from a prediction structure used for a previous sequence of frames. However, in some cases, the encoding device 104 can also decide at any of the non-anchor frames (e.g., frames 1 through 7) in the sequence whether to switch to a different prediction structure. If the encoding device 104 determines to switch to a different prediction structure, it can use that different prediction structure to encode subsequent frames until or unless it decides to switch to yet another prediction structure at a subsequent frame.

The prediction structure 550 in FIG. 5B has a prediction distance 552 of size M=8 configured for the sequence of frames (i.e., frames 0 through 8). As previously explained, the prediction distance (552), which in this example is M=8, can represent the maximum distance permitted between a current frame (e.g., a referencing frame) and a reference frame used by the current frame from the sequence of frames (i.e., frames 0 through 8). In other words, the prediction distance (552) defines how far out (e.g., how many frames away), which in this example is 8 (M=8), a current frame can go when referencing another frame(s) for predictive coding.

For example, since the prediction distance 552 of the prediction structure 550 is set to M=8, where M is the maximum distance in frames from the current frame that can be used by the current frame when referencing other frames, any frame in the prediction structure 550 can only reference frames that are up to 8 frames away from that frame.

As previously noted, the prediction structure 550 can define the order in which frames are encoded. The order can depend on the prediction distance 552 and the types of frames in the prediction structure 550, which determine the order in which frames 0 through 8 (554-570) in the sequence are encoded. For example, the types of frames (e.g., I frames, P frames, B frames) in the sequence (e.g., frames 0 through 8) dictate the directionality of references and/or predictions (e.g., both preceding frames in the case of P frame 570, preceding and following frames in the case of B frames 556-568, and the current frame in the case of I frame 554) and the prediction distance 552 dictates the maximum distance between a current frame and a reference frame used by the current frame.

As illustrated by the prediction structures 500 and 550 in FIGS. 5A and 5B, the prediction distance of a prediction structure can vary in size from 1 to a value greater than 1. The size of the prediction distance and the number of anchor frames for a sequence of frames can be determined based on the characteristics of the content in the sequence of frames. For example, for a static (or significantly static) sequence of frames, where little or no motion is present across the sequence of frames, a larger prediction structure size (e.g., a longer prediction distance) and less frequent use of anchor frames (e.g., as reflected in the prediction structure 550) may be preferable over a shorter prediction structure size and/or more frequent use of anchor frames (e.g., as reflected in the prediction structure 500) to achieve better coding efficiency. On the other hand, for sequence of frames with a significant amount of motion or scene changes, a smaller prediction structure size (e.g., a shorter prediction distance) and more frequent use of anchor frames (e.g., as reflected in the prediction structure 500) may be preferable over a larger prediction structure size and/or less frequent use of anchor frames (e.g., as reflected in the prediction structure 550) to achieve a higher encoding performance with lower distortion.

This relationship between the amount of motion in frames, the prediction structure size, and the frequency of use of anchor frames leverages the fact that the more static the content is in a sequence of frames, the less the pixels or content change between frames in the sequence, thus allowing information from a frame to be reused more frequently and with better results (e.g., quality) than in the case where the content in a sequence of frames has a greater amount of motion. The characteristics of the content in a sequence of frames, such as the changes in motion (or lack of changes in motion), can thus be used to intelligently adjust the prediction structure size M (i.e., the prediction distance) of the prediction structure used for the sequence of frames in order to balance and optimize coding efficiency and quality. The techniques herein can therefore adaptively switch between short distance (SD) prediction modes (e.g., prediction structures), such as prediction structure 500, that have a size or prediction distance of 1 or below a threshold value greater than 1, and long distance (LD) prediction modes (e.g., prediction structures), such as prediction structure 550, that have a size or prediction distance of above a threshold value that is greater than 1, when coding frames in a sequence or sequences.

For example, static (or slow motion) video, such as video telephony (VT) and surveillance video, are generally highly temporally correlated. The temporal redundancy in such video can be utilized through longer reference distances and/or larger prediction structure sizes (M) to increase coding efficiency. On the other hand, high motion videos and videos with many scene changes have less redundancy and are generally better suited for predictive encoding schemes involving shorter reference distances and/or smaller prediction structure sizes (M). However, in practical applications, there is generally no prior knowledge of the characteristics of the video, or the characteristics of the video can vary at different times. Therefore, to improve the encoding performance and efficiency for a video, the prediction structure (e.g., 500, 550) used for encoding the video can be intelligently adapted based on the characteristics of the video, such as motion, scene changes and content type.

To illustrate, as the encoding device 104 encodes a video, it can determine a prediction structure, such as a short prediction structure (e.g., 500), with a particular size and prediction distance calculated based on the characteristics of one or more frames processed for the video, and subsequently switch to a different prediction structure, such as a long prediction structure (e.g., 550), with a different size and prediction distance calculated based on different characteristics of one or more frames subsequently processed for the video. In some cases, when switching between prediction structures, the encoding device 104 can switch from a current prediction structure to a different prediction structure that has a same size or prediction distance as the current prediction structure but otherwise has other characteristics or configuration details. For example, the encoding device 104 may implement a prediction structure with a fixed size or prediction distance, such as a low delay P prediction structure with a size or prediction distance of M=8, and subsequently switch to a different prediction structure with the same fixed size or prediction distance but a different configuration, such as a low delay B prediction structure with a size or prediction distance of M=8.

The decision to switch from one prediction structure to another can be made based on a determination that the characteristics of the frame(s) in the video used to calculate the current prediction structure differ from the characteristics of one or more subsequent frames and the new characteristics are better suited for the different prediction structure. Determinations on whether to switch to a different prediction structure can occur at one or more positions (e.g., frames) in the video sequence, which can be defined by the particular prediction structure or configuration being implemented. For example, such decisions can be made at every anchor frame in a sequence, every frame in the sequence including non-anchor frames, every n number of frames, etc.

As previously noted, the prediction structures 500 and 550 in FIGS. 5A and 5B can be used to predict and encode frames or samples from other frames or samples. For example, a prediction can be applied among pixels in adjacent or temporally neighboring frames. The prediction can match blocks (i.e., groups of pixels) in a current frame with the blocks in one or more past and/or future frames used as reference frames, calculate motion vectors identifying motion in the reference frames and an offset from the coordinate position of the blocks in the current frame to the coordinates of the blocks in the reference frames, and use the motion vectors to predict the current frame (e.g., predict the blocks in the current frame).

Figure 6A:
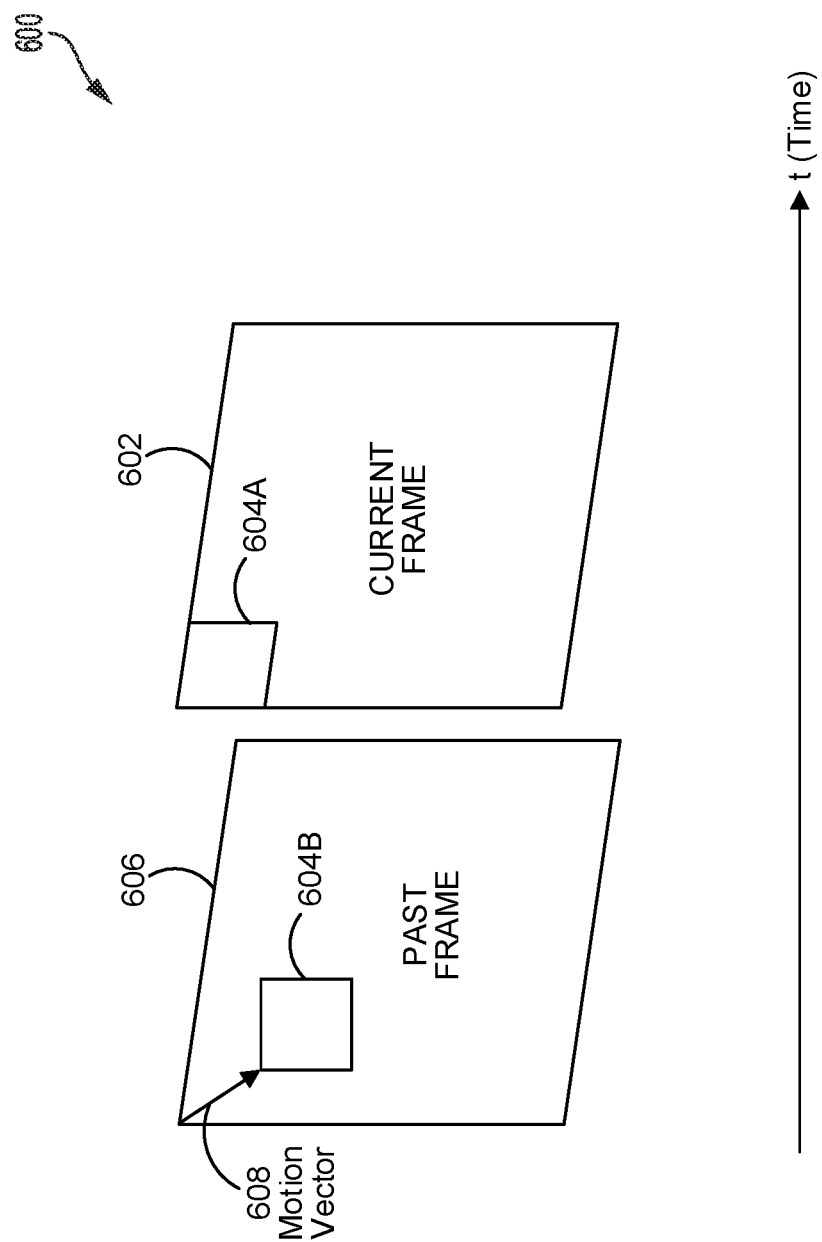
FIG. 6A illustrates an example uni-directional temporal prediction scheme involving block matching and motion compensation, in accordance with some examples.

FIG. 6A illustrates an example uni-directional temporal prediction scheme 600 involving block matching and motion compensation. In this example, a past frame (606) is used as reference frame. A block 604A in a current frame 602 is matched with block 604B in the past reference frame 606. The matching block 604B in the past reference frame 606 can represent the best-match in the past reference frame 606 of the block 604A in the current frame 602. Once the matching block 604B in the past reference frame 606 has been identified, a motion vector 608 can be computed for the predictive coding.

The motion vector 608 identifies motion in the past reference frame 606 and, in particular, an offset from the coordinate position of the block 604A in the current frame 602 to the coordinate position of the matching block 604B in the past reference frame 606. In other words, the motion vector 608 can measure a displacement in the blocks 604A-B and/or their associated pixels. The motion vector 608 can be used to predict the block 604A in the current frame 602 and encode the differences between the blocks 604A-B after motion compensation.

Figure 6B:
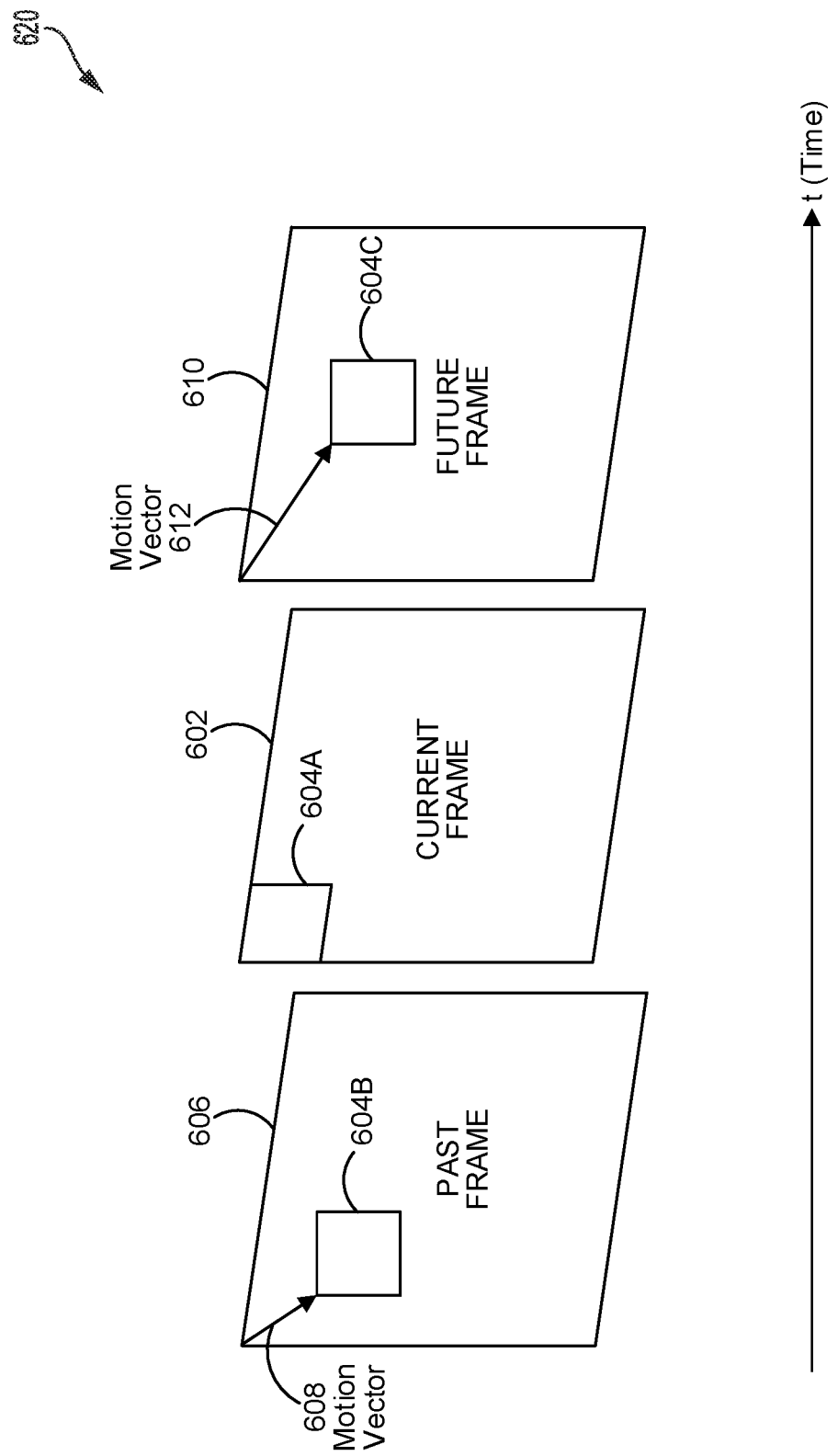
FIG. 6B illustrates an example bi-directional prediction scheme involving block matching and motion compensation, in accordance with some examples.

FIG. 6B illustrates an example bi-directional prediction scheme 620 involving block matching and motion compensation. In this example, a past frame (606) and a future frame (610) are used as reference frames. The block 604A in the current frame 602 is matched with block 604B in the past reference frame 606 and block 604C in the future reference frame 610. The blocks 604B-C can represent the best-matches of block 604A found in the past reference frame 606 and the future reference frame 610. Once the matching blocks 604B-C in the past frame 606 and the future reference frame 610 are identified, motion vectors 608 and 612 can be respectively computed for the matching block 604B in the past reference frame 606 and the matching block 604C in the future reference frame 610.

As previously explained, the motion vector 608 can identify motion in the past reference frame 606 and, in particular, an offset (or displacement) from the coordinate position of the block 604A in the current frame 602 to the coordinate position of the matching block 604B in the past reference frame 606. Similarly, the motion vector 612 can identify motion in the future reference frame 610 and, in particular, an offset (or displacement) from the coordinate position of the block 604A in the current frame 602 to the coordinate position of the matching block 604C in the future reference frame 610. The motion vectors 608 and 612 can be used to predict the block 604A in the current frame 602 and encode the differences between the blocks 604A-C after motion compensation.

Figure 7A:
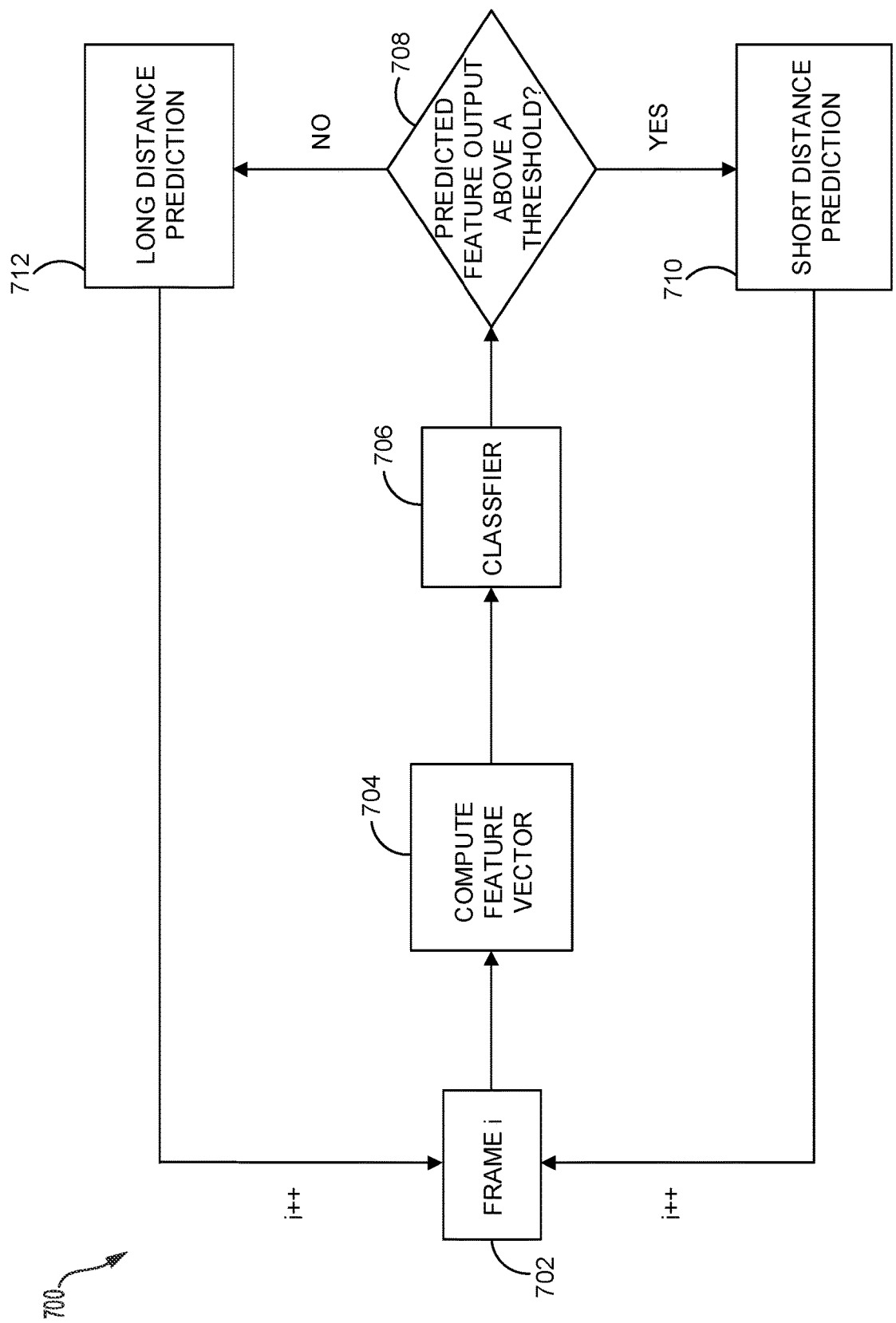
FIGS. 7A and 7B illustrate example flows for selecting adaptive prediction modes and structures or switching between adaptive prediction modes and structures when encoding a sequence of frames, in accordance with some examples.
Figure 7B:
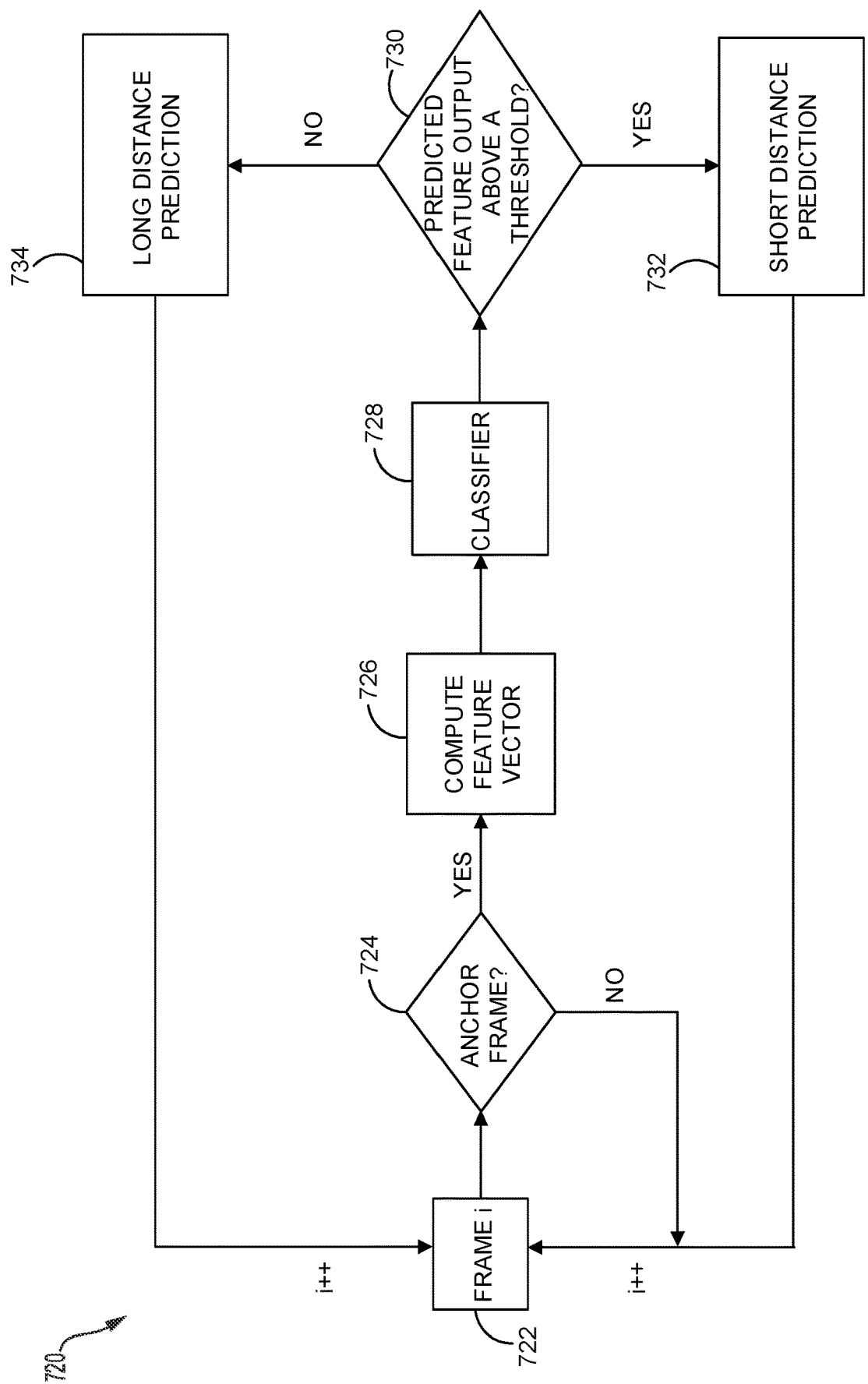

The disclosure now turns to the example flows 700 and 720 for switching between adaptive prediction modes and structures for encoding a sequence of frames, illustrated in FIGS. 7A and 7B. For the sake of clarity, the flows 700 and 720 are described with reference to the encoding device 104, as shown in FIG. 1

FIG. 7A illustrates an example flow 700 for selecting adaptive prediction modes and structures or switching between adaptive prediction modes and structures when encoding a sequence of frames. In this example, the adaptive prediction modes described include short distance prediction and long distance prediction, which implement different sizes or prediction distances. However, the short distance prediction and long distance prediction herein are non-limiting examples of adaptive prediction modes used for explanation purposes. Other adaptive prediction types or configurations can also be implemented in addition to, or in lieu of, the short distance prediction and long distance prediction in this example. For example, in some cases, flow 700 can switch between predication structures having a same size or prediction distance but having other differing characteristics, such as different structures and/or frame types (e.g., low delay P, low delay B, random access, hierarchical P, hierarchical B), different configurations of anchor frames (e.g., a different number and/or order of anchor frames), etc.

At step 702 of flow 700, the encoding device 104 obtains a frame (frame i) in a sequence of frames, and at step 704 the encoding device 104 computes a feature vector based on the frame in the sequence. The frame can be an I frame in the sequence, an anchor frame in the sequence, a non-anchor frame in the sequence, a frame at a particular location in the sequence, or any frame in the sequence. The encoding device 104 can compute the feature vector based on frame statistics collected for the frame, such as one or more motion vectors associated with one or more blocks in the frame, content characteristics of the frame, coding statistics or characteristics associated with the frame, etc.

In some implementations, the encoding device 104 can compute a feature vector $x_i$, where $x_0=MV_{avg}$, $x_1=IntraRatio$, and $x_2=SkipRatio$, and where $MV_{avg}$ is an average motion vector generated based on motion vectors calculated for one or more blocks or regions in the frame, IntraRatio is a percentage of pixels coded in the frame by intra prediction modes, and SkipRatio is the percentage of pixels coded in the frame by skip mode among the pixels coded in the frame by inter prediction modes. The average motion vector provides an indication of the average motion in the frame, and the IntraRatio and SkipRatio provides additional details regarding the amount of redundancy and/or static content in the frame, which can be inferred or ascertained given the amount of pixels coded by intra prediction and skip mode.

Moreover, the IntraRatio parameter can indicate the motion estimation performance for a frame or a block in a frame. For example, the IntraRatio of a frame may suggest or indicate that motion estimation for the frame was unsuccessful. The IntraRatio of a frame may also be used to detect scene changes. For example, a first frame of a new scene often has a high ratio of intra-coded blocks or pixels. In general, frames of a scene change can have a higher ratio of intra-coded blocks or pixels than previous frames. Accordingly, the IntraRatio of a frame can be used to determine whether the frame is associated with a scene change, which generally involves a higher amount of motion. Therefore, the IntraRatio parameter can provide meaningful information or statistics about the motion and characteristics of a frame.

As previously noted, SkipRatio indicates the ratio of blocks encoded in skip mode with respect to the number of blocks not encoded in intra mode. In video coding, skip mode can indicate that the motion data for a block is inferred instead of explicitly signaled and the prediction residual is zero, meaning that no transform coefficients are transmitted. Skip mode is often used to code static regions in a frame where the prediction error tends to be small. A CU (coding unit) in an inter-prediction slice can include a skip indicator which suggests a lack of residual data in the bitstream, the use of block merging to calculate the motion data associated with the CU, and/or the CU contains only one PU (prediction unit). In skip mode, the motion activity values of a block are generally smaller than those in blocks encoded in non-skip modes. Moreover, a higher SkipRatio can indicate that a higher number of blocks are copied from a previous frame, which suggests that a higher number of blocks in the frame are located in slow motion or stationary regions.

Accordingly, the SkipRatio of a frame can be used to determine an amount of motion in the frame.

Figure 8:
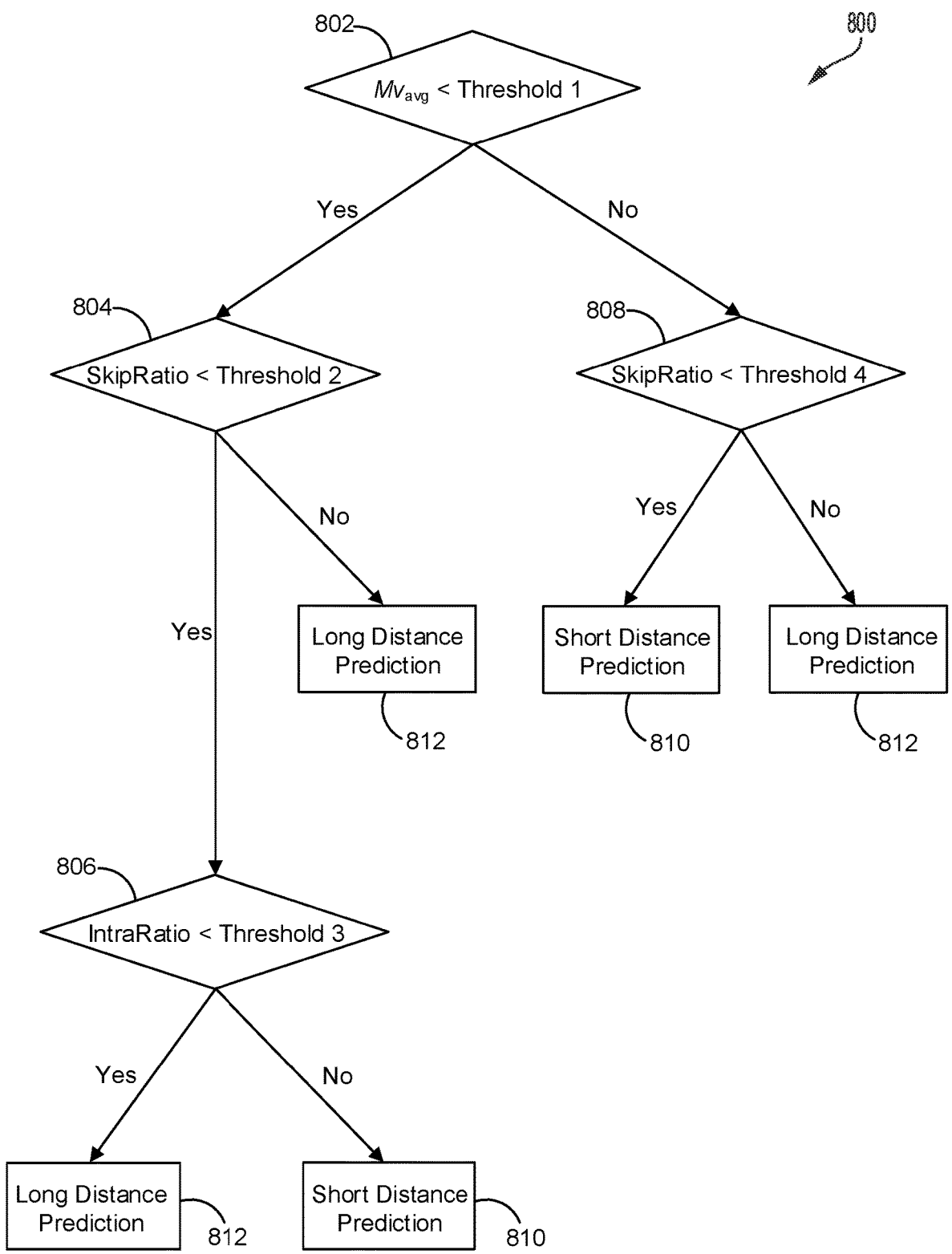
FIG. 8 illustrates an example decision tree classifier for selecting an adaptive prediction mode or structure for a frame or sequence of frames or switching between adaptive prediction modes or structures, in accordance with some examples.

At step 706, the encoding device 104 can input the feature vector ($x_1$) into a classifier, which can use the feature vector to generate a predicted feature output and the predicted feature output to select a prediction mode or structure (e.g., short distance prediction or long distance prediction). The classifier can be any classifier or classification algorithm, such as a linear classifier, a decision tree classifier, a support vector machine (SVM), etc. In some implementations, the classifier can be a decision tree classifier as shown in FIG. 8. In other implementations, the classifier can be a linear classifier. One example linear classifier is represented by the linear classifier equation illustrated below:

$$\hat{y} = \Sigma_{i=0}^{n} w_i x_i + b,\qquad\text{Equation 1,}$$

where $x_0 = MV_{avg}$, $x_1 = \text{IntraRatio}$, $x_2 = \text{SkipRatio}$, and where $w_i$ represents one or more weights, $b_i$ represents one or more biases, n represents the number of parameters (i), and $\hat{y}$ represents the predicted feature output value(s) or score(s). In some cases, the weights $w_i$ can be trained using one or more classifiers, such as an SVM classifier. Moreover, in some cases, the values of the weights $w_i$ can vary depending on the value of the feature vector $x_i$. For example, if $MV_{avg}$ is high (e.g., above a certain threshold), $w_i$ may be increased to steer the classifier towards selecting the short distance prediction (e.g., if such prediction mode is preferable), and vice versa.

As previously mentioned, the classifier can generate a predicted feature output (e.g., $\hat{y}$) and use the predicted feature output to select the short distance prediction or long distance prediction. Thus, in the example flow 700, at step 708, the classifier can determine whether to use short distance prediction or long distance prediction for the frame and any subsequent frames. If a prediction mode or structure was previously selected for the sequence, at step 708 the classifier can decide whether to continue using the current prediction mode or structure, or switch to a different prediction mode or structure. For example, if the current prediction mode or structure is short distance prediction, the classifier at step 708 can determine whether to continue using the short distance prediction or switch to the long distance prediction.

In some cases, at step 708, the classifier can determine whether to select the short distance prediction or the long distance prediction based on whether the predicted feature output (e.g., $\hat{y}$) is above or below a threshold. For example, if the predicted feature output (e.g., $\hat{y}$) is greater than 0 (indicating for example that the content in the frame has a certain amount of motion or scene changes), at step 710, the classifier can select the short distance prediction. The encoding device 104 can then implement the short distance prediction for the frame and return to step 702 in the flow 700. If, on the other hand, the predicted feature output (e.g., $\hat{y}$) is less than 0 (indicating for example that the content in the frame is fairly static or has few or no scene changes), at step 712 the classifier can select the long distance prediction. The encoding device 104 can then implement the long distance prediction for the frame and return to step 702 in the flow 700. Thus, using Equation 1 above as an example classifier equation used by the classifier, if $\hat{y} > 0$ then the classifier can select the short distance prediction. Otherwise, the classifier can select the long distance prediction.

FIG. 7B illustrates another example flow 720 for selecting adaptive prediction modes and structures or switching between adaptive prediction modes and structures when encoding a sequence of frames. In this example, the flow 720 is implemented at each anchor frame. For example, at step 722 of flow 720, the encoding device 104 obtains a frame (frame i) in a sequence of frames. At step 724, the encoding device 104 determines whether the frame is an anchor frame. If the frame is not an anchor frame, the flow 720 returns to step 722 where the encoding device 104 can obtain a next frame and again check if the next frame is an anchor frame at step 724.

If the encoding device 104 determines at step 724 that the frame is an anchor frame, at step 726 the encoding device 104 then computes a feature vector for the frame as previously described. For example, the encoding device 104 can compute a feature vector $x_i$, where $x_0 = MV_{avg}$, $x_1 = \text{IntraRatio}$, and $x_2 = \text{SkipRatio}$ as previously described.

At step 728, the encoding device 104 can input the feature vector ($x_i$) into a classifier, which can use the feature vector to generate a predicted feature output and the predicted feature output to select a prediction mode or structure (e.g., short distance prediction or long distance prediction). The classifier can be any classifier or classification algorithm, such as a linear classifier, a decision tree classifier, an SVM, etc. For illustration purposes, in this example, the flow 720 will be described as implementing a linear classifier represented by Equation 1 as described above.

The classifier can generate the predicted feature output (e.g., $\hat{y}$) and use the predicted feature output to select short distance prediction or long distance prediction. Thus, at step 730, the classifier determines whether to use short distance prediction or long distance prediction for the frame (and any subsequent frames). If a prediction mode or structure was previously selected for the sequence, at step 730 the classifier can decide whether to continue using the current prediction mode or structure, or switch to a different prediction mode or structure. For example, if the current prediction mode or structure is long distance prediction, the classifier at step 730 can determine whether to continue using the long distance prediction or switch to the short distance prediction.

In some cases, at step 730, the classifier can determine whether to select the short distance prediction or the long distance prediction based on whether the predicted feature output (e.g., $\hat{y}$) is above or below a threshold. For example, if the predicted feature output (e.g., $\hat{y}$) is greater than 0 (e.g., $\hat{y} > 0$), at step 732, the classifier can select the short distance prediction. The encoding device 104 can then implement the short distance prediction for the frame and return to step 722 in the flow 720. If, on the other hand, the predicted feature output (e.g., $\hat{y}$) is less than 0 (e.g., $\hat{y} < 0$ then), at step 734 the classifier can select the long distance prediction. The encoding device 104 can then implement the long distance prediction for the frame and return to step 722 in the flow 720.

FIG. 8 illustrates an example decision tree classifier 800 for selecting an adaptive prediction mode or structure for a frame or sequence of frames or switching between adaptive prediction modes or structures. The decision tree classifier 800 illustrates an example classifier configuration which could be implemented at steps 708 or 730 of flows 700 and 720, as shown in FIGS. 7A and 7B.

The decision tree classifier 800 (or classification tree) provides a set of "if and then statements" (802-808) for selecting a prediction mode or structure (e.g., short distance prediction 810 or long distance prediction 812). The set of statements (802-808) can be defined through training, for example. The set of statements (802-808) can check if different frame statistics or features, such as motion statistics, content characteristics, coding statistics, etc., are less or greater than specific threshold values defined for the different frame statistics or features (e.g., through training).

In some cases, different decision tree classifiers can be generated and trained for selecting different prediction modes or structures. For example, different decision tree classifiers may be trained for prediction structures with different sizes or configurations. To illustrate, if a current prediction structure has a size or prediction distance (M) of 8, the decision tree classifier implemented may be different than the decision tree classifier used in cases where the current prediction structure has a size or prediction distance (M) of 1. Moreover, in some cases, the decision tree classifier 800 may be more effective in selecting a prediction structure for encoding a sequence than other types of classifiers. For example, the decision tree classifier 800 may outperform a linear classifier when rate control is enabled for a sequence of frames. Thus, in such scenarios, the decision tree classifier 800 may be the preferred classifier for selecting prediction structures for the sequence of frames and determining when to switch to different prediction structures.

Further, the frame statistics or features implemented by the set of statements (802-808) in the example decision tree classifier 800 illustrated in FIG. 8 include $MV_{avg}$, SkipRatio, and IntraRatio values calculated for a frame as previously described with reference to FIGS. 7A and 7B. However, it should be noted that the frame statistics or features implemented by the decision tree classifier 800 shown in FIG. 8 are non-limiting examples provided for explanation purposes. In other examples, the decision tree classifier 800 may implement one or more of the same or different frame statistics or features, and/or a different number of statements which can implement one or more of the same or different frame statistics or features as those shown in FIG. 8. For example, in some cases, the decision tree classifier 800 may include additional statements configured to check if certain content characteristics or statistics, such as a type of content (e.g., screen content, outdoor content, indoor content, etc.) or a scene change parameter, are less than or greater than respective thresholds defined for those content characteristics or statistics.

With reference to the example decision tree classifier 800, at statement 802, the decision tree classifier 800 determines whether the $MV_{avg}$ is less than a first threshold defined for the $MV_{avg}$. If the $MV_{avg}$ is less than the first threshold, the decision tree classifier 800 proceeds to statement 804, where it determines whether the SkipRatio is less than a second threshold defined for the SkipRatio. The second threshold can be, for example, a threshold percentage of pixels coded in the frame by skip mode among the pixels coded in the frame by inter prediction modes.

If at statement 804 the decision tree classifier 800 determines that the SkipRatio is greater than the second threshold, the decision tree classifier 800 selects long distance prediction 812 for the frame. If, on the other hand, the decision tree classifier 800 determines at statement 804 that the SkipRatio is less than the second threshold, the decision tree classifier 800 proceeds to statement 806, where it determines whether the IntraRatio is less than a third threshold defined for the IntraRatio. The third threshold can be, for example, a threshold percentage of pixels coded in the frame by intra prediction modes.

If at statement 806 the decision tree classifier 800 determines that the IntraRatio is greater than the third threshold, the decision tree classifier 800 selects short distance prediction 810. Otherwise, the decision tree classifier 800 selects long distance prediction 812.

Returning to statement 802, if the decision tree classifier 800 determines that the $MV_{avg}$ is greater than the first threshold, it proceeds to statement 808 where it determines if the SkipRatio is less than a fourth threshold defined for the SkipRatio. At statement 808, if the decision tree classifier 800 determines that the SkipRatio is less than the fourth threshold, the decision tree classifier 800 selects short distance prediction 810 for the frame. Otherwise, the decision tree classifier 800 selects long distance prediction 812.

Figure 9A:
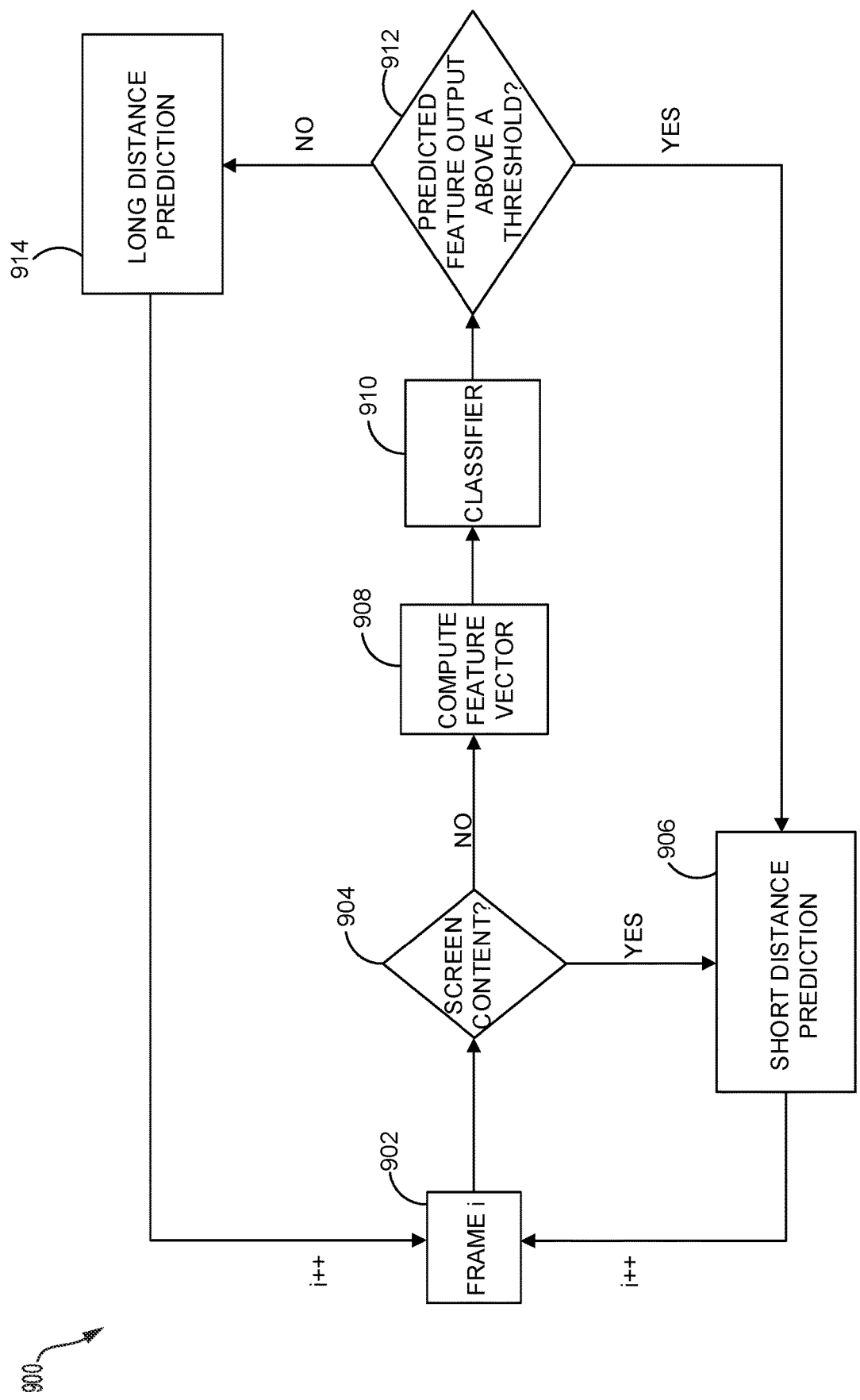
FIGS. 9A and 9B illustrate example flows for selecting adaptive prediction modes and structures or switching between adaptive prediction modes and structures when encoding frames that may contain screen content, in accordance with some examples.

FIG. 9A illustrates an example flow 900 for selecting adaptive prediction modes and structures or switching between adaptive prediction modes and structures when encoding frames that may contain screen content. Screen content refers to content that captures at least a portion of a screen, such as a computer or television screen or display. For example, screen content can include a screen that is captured in one or more frames during a recording of a video. Frames or sequences of frames containing screen content have different characteristics than frames or sequences of frames containing natural scenes, which may affect what types of prediction structures perform better when encoding such content. For example, screen content is often very sharp and may have sudden or frequent changes. To illustrate, screen content can change rapidly and frequently such as when the scenes depicted on a television screen frequently change or when a user navigates away from a page displayed on a computer screen.

Moreover, the content in screen content can change rapidly or suddenly. For example, the content displayed on a television or computer screen may change rapidly while the content is being recorded. The resulting video frames may thus have rapid changes and sharp edges. Consequently, in general, short (or shorter) distance prediction structures may perform better than long (or longer) distance prediction structures when dealing with screen content. In particular, short distance prediction structures with a low delay P configuration generally outperform other prediction structures when encoding screen content. As a result, flow 900 can implement a screen content classifier that is added before the decision process (e.g., step 912) where a classifier selects a particular prediction mode or structure for a frame based on the feature vector. The screen content classifier can analyze the content in a frame and detect whether the content includes screen content and, if so, the screen content classifier can select a short distance prediction mode or structure to handle the frame containing the screen content.

Turning to the example flow 900, at step 902, the encoding device 104 first obtains a frame (frame i) in a sequence of frames. At step 904, a screen content classifier determines if the frame includes screen content. If the screen content classifier determines that the frame includes screen content, at step 906 the screen content classifier selects short distance prediction for the frame. Otherwise, the flow 900 proceeds to step 908, where the encoding device 104 computes a feature vector based on the frame. The frame in this example can be an I frame in the sequence, an anchor frame in the sequence, a non-anchor frame in the sequence, a frame at a particular location in the sequence, or any frame in the sequence.

The encoding device 104 can compute the feature vector based on frame statistics collected for the frame, such as one or more motion vectors associated with one or more blocks in the frame, content characteristics of the frame, coding statistics or characteristics associated with the frame, etc. For example, in some implementations, the encoding device 104 can compute a feature vector $x_i$, where $x_0=MV_{avg}$=IntraRatio, and $x_2$=SkipRatio, as previously described.

At step 910, the encoding device 104 can input the feature vector ($x_i$) into a classifier, which can use the feature vector to generate a predicted feature output and the predicted feature output to select a prediction mode or structure (e.g., short distance prediction or long distance prediction). The classifier can be any classifier or classification algorithm, as previously described, such as a linear classifier, a decision tree classifier, an SVM, etc.

At step 912, the classifier can determine whether to use short distance prediction or long distance prediction for the frame (and any subsequent frames). If a prediction mode or structure was previously selected for the sequence, at step 912 the classifier can decide whether to continue using the current prediction mode or structure, or switch to a different prediction mode or structure.

In some cases, at step 912, the classifier can determine whether to select short distance prediction or long distance prediction based on whether the predicted feature output (e.g., $\hat{y}$) is above or below a threshold. For example, if the predicted feature output (e.g., $\hat{y}$) is greater than 0, at step 906, the classifier can select short distance prediction. The encoding device 104 can then implement the short distance prediction for the frame and return to step 902 in the flow 900. If, on the other hand, the predicted feature output (e.g., $\hat{y}$) is less than 0, at step 914 the classifier can select long distance prediction. The encoding device 104 can then implement long distance prediction for the frame and return to step 902 in the flow 900.

Figure 9B:
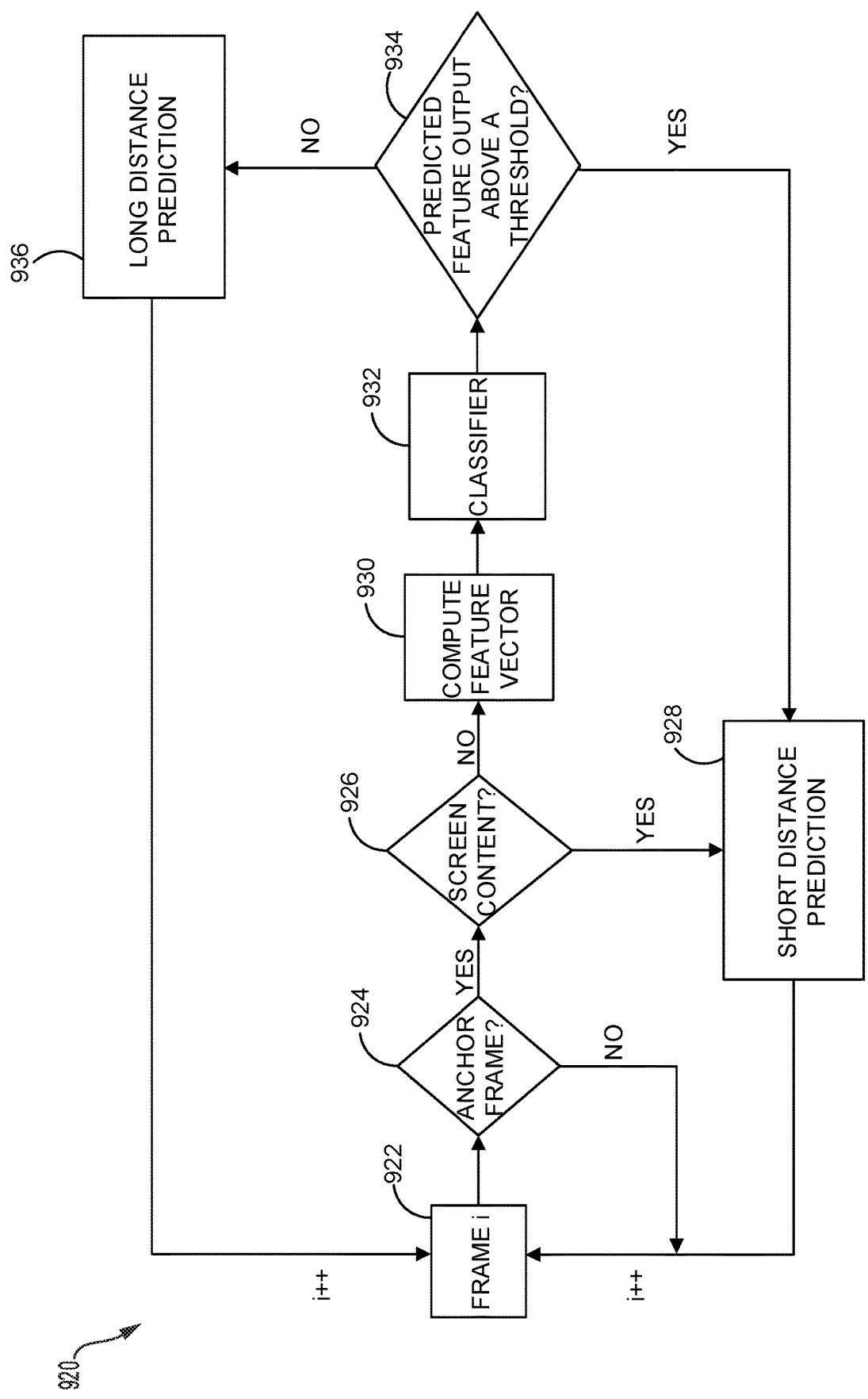

FIG. 9B illustrates another example flow 920 for selecting adaptive prediction modes and structures or switching between adaptive prediction modes and structures when encoding frames that may contain screen content. In this example, the flow 920 is implemented at each anchor frame. Thus, decisions to select an adaptive prediction mode or structure or to switch from a current adaptive prediction mode or structure to a different adaptive prediction mode or structure are made when processing anchor frames in a sequence (e.g., at anchor frame locations in a sequence), as opposed to flow 900 in FIG. 9A which can make such decisions at any frame, such as anchor frames, non-anchor frame, every frame, every n number of frames, etc.

Starting at step 922, flow 920 beings by with the encoding device 104 obtaining a frame (frame i) in a sequence of frames. At step 924, the encoding device 104 determines whether the frame is an anchor frame. If the frame is not an anchor frame, the flow 920 returns to step 922 where the encoding device 104 can obtain a next frame and again check if the next frame is an anchor frame at step 924.

If the encoding device 104 determines at step 924 that the frame is an anchor frame, at step 926 a screen content classifier determines if the frame includes screen content. If the screen content classifier determines that the frame includes screen content, at step 928 the screen content classifier selects short distance prediction for the frame. Otherwise, the flow 920 proceeds to step 930 where the encoding device 104 computes a feature vector based on the frame.

As previously explained, the encoding device 104 can compute the feature vector based on frame statistics collected for the frame, such as one or more motion vectors associated with one or more blocks in the frame, content characteristics of the frame, coding statistics or characteristics associated with the frame, etc. For example, in some implementations, the encoding device 104 can compute the feature vector $x_1$, where $x_0=MV_{avg}$, $x_1$=IntraRatio, and $x_2$=SkipRatio.

At step 932, the encoding device 104 can input the feature vector ($x_1$) into a classifier, which can use the feature vector to generate a predicted feature output and the predicted feature output to select a prediction mode or structure (e.g., short distance prediction or long distance prediction). The classifier can be any classifier or classification algorithm, as previously described, such as a linear classifier, a decision tree classifier, an SVM, etc.

At step 934, the classifier can determine whether to use short distance prediction or long distance prediction for the frame (and any subsequent frames) based on the predicted feature output from step 932. If a prediction mode or structure was previously selected for the sequence, at step 934 the classifier can decide whether to continue using the current prediction mode or structure, or switch to a different prediction mode or structure.

In some cases, at step 934, the classifier can determine whether to select short distance prediction or long distance prediction based on whether the predicted feature output (e.g., $\hat{y}$) is above or below a threshold. For example, if the predicted feature output (e.g., $\hat{y}$) is greater than 0, at step 928, the classifier can select short distance prediction. The encoding device 104 can then implement the short distance prediction for the frame and return to step 922. If, on the other hand, the predicted feature output (e.g., $\hat{y}$) is less than 0, at step 936 the classifier can select long distance prediction. The encoding device 104 can then implement long distance prediction for the frame and return to step 922.

Figure 10:
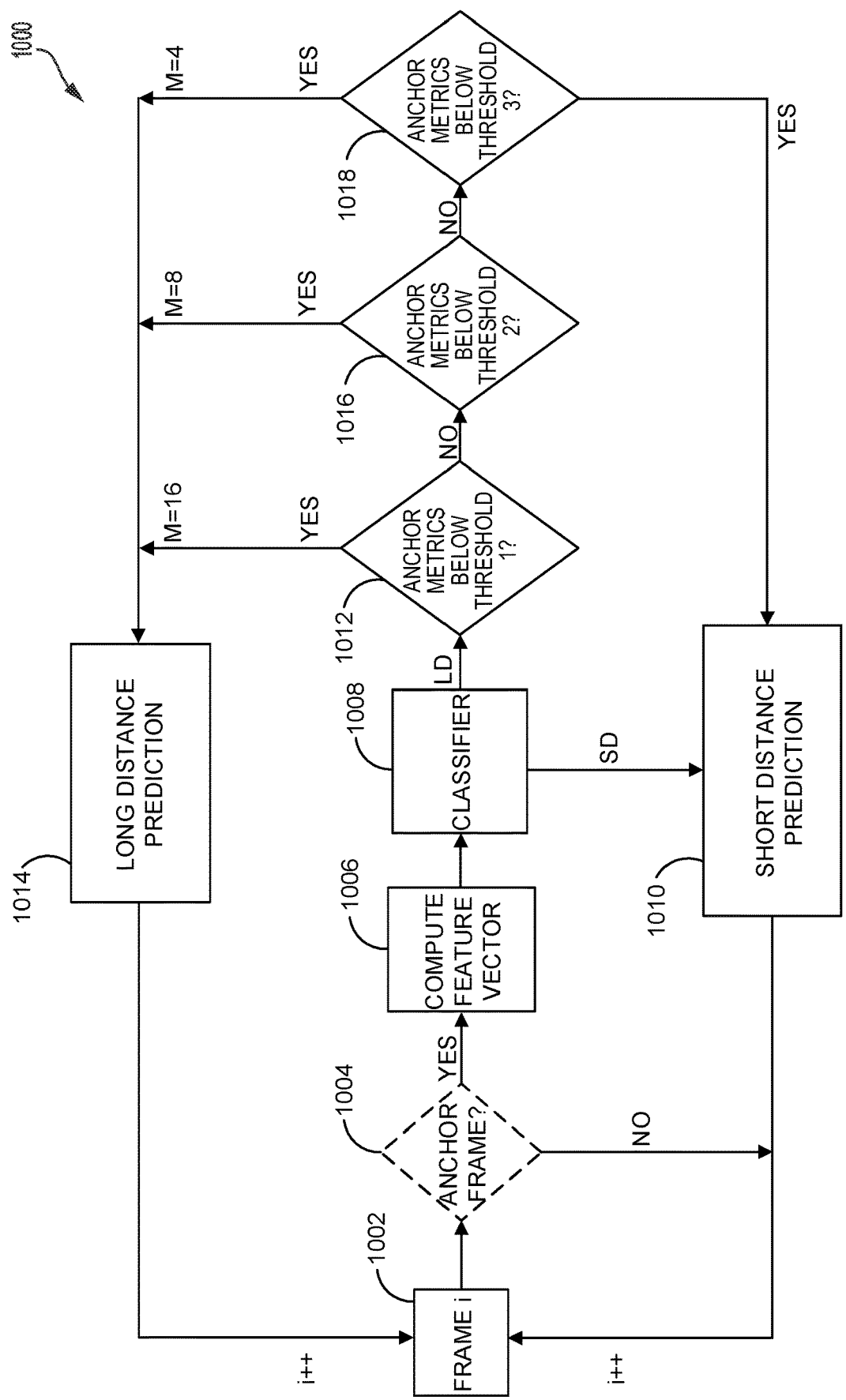
FIG. 10 illustrates an example flow for selecting adaptive prediction modes or structures and adapting the prediction structure size or distance of long distance prediction structures when selecting prediction structures, in accordance with some examples.

FIG. 10 illustrates an example flow 1000 for selecting adaptive prediction modes or structures and adapting the prediction structure size or distance of long distance prediction structures when selecting such structures. The selecting of adaptive prediction modes or structures in flow 1000 can include switching between adaptive prediction modes or structures if a prediction mode or structure has been previously selected.

In this example, at step 1002, the encoding device 104 first obtains a frame (frame i) in a sequence of frames. At step 1004, the encoding device 104 can optionally determine whether the frame is an anchor frame. Step 1004 can be implemented in scenarios where adaptive prediction mode or structure selections or decisions are made at anchor frame locations in a sequence (e.g., when processing anchor frames as opposed to non-anchor frames). However, in some implementations, such selections or decisions can be implemented at other frames as well, including, for example, non-anchor frames, every frame in a sequence, every n number of frames in a sequence, etc. In such examples, flow 1000 can skip step 1004 and instead proceed directly to step 1006. Alternatively, in scenarios where such decisions or selections are made at other specific frames (e.g., in addition to anchor frames), such as every n number of frames or every frame of type x such as every I, P, or B frame, step 1004 can involve determining whether the frame is an anchor frame and/or other specific frame(s) configured to trigger the remaining steps in flow 1000, such as frame number n, a type x frame, etc.

In the example scenario shown in FIG. 10 where the remaining steps in the flow 1000 are implemented at anchor frames, if the frame is determined not to be an anchor frame at step 1004, the flow 1000 returns to step 1002 where the encoding device 104 can obtain a next frame and again check if the next frame is an anchor frame at step 1004. On the other hand, if the frame is determined to be an anchor frame at step 1004, the flow 1000 proceeds to step 1006 where the encoding device 104 computes a feature vector for the frame as previously described. In one illustrative example, the encoding device 104 can compute feature vector $x_i$, where $x_0 = MV_{avg}$, $x_1 = $IntraRatio, and $x_2 = $SkipRatio as previously described.

The encoding device 104 can input the feature vector ($x_1$) into a classifier, which at step 1008 can use the feature vector to generate a predicted feature output and use the predicted feature output to select a prediction mode or structure (e.g., short distance prediction or long distance prediction). For example, the classifier can generate the predicted feature output (e.g., ŷ) and use the predicted feature output to select short distance prediction or long distance prediction. The classifier can be any classifier or classification algorithm, such as a linear classifier, a decision tree classifier, an SVM, etc., as previously described. In one illustrative example, the classifier can be a multi-class decision or classification tree.

At step 1010, the classifier can select short distance prediction for the frame (and any subsequent frames) based on the predicted feature output as previously described. On the other hand, if at step 1008 the classifier selects long distance prediction for the frame, the classifier can proceed to steps 1012, 1016, and/or 1018 where it performs multi-class classification based on the amplitude of certain metrics, such as $MV_{avg}$, to determine a prediction structure size or distance (M) for the long distance prediction.

For example, at step 1012, the classifier can determine whether anchor metrics (e.g., feature vector ($x_i$), $MV_{avg}$, etc.) from the feature vector ($x_i$) computed at step 1008 are below a first threshold defined (e.g., via training) for the specific anchor metrics implemented. If the anchor metrics are below the first threshold, the classifier can select a particular prediction structure size or distance (M) defined for when the anchor metrics are below the first threshold. In this example, the prediction structure size or distance M at step 1012 is 16 (M=16). At step 1014, the classifier then selects long distance prediction with the prediction structure size or distance M=16.

If the anchor metrics are not below the first threshold, the classifier can proceed to step 1016, where it determines whether the anchor metrics are below a second threshold defined (e.g., via training) for the anchor metrics. If the anchor metrics are below the second threshold (and above the first threshold as determined in step 1012), the classifier can select a different prediction structure size or distance (M) defined for when the anchor metrics are below the second threshold. In this example, the prediction structure size or distance M at step 1016 is 8 (M=8). At step 1014, the classifier then selects long distance prediction with the prediction structure size or distance M=8.

As illustrated here, the prediction structure size or distance M at step 1016 is smaller than the prediction structure size or distance M at step 1012. The classifier here can determine based on the anchor metrics that the prediction structure size or distance should be smaller because, for example, the frame or frame content is less static or contains a higher number or frequency of scene changes than in cases where the classifier determines that the anchor metrics are below the first threshold in step 1012.

If the anchor metrics are not below the second threshold, the classifier can proceed to step 1018, where it determines whether the anchor metrics are below a third threshold defined (e.g., via training) for the anchor metrics. If the anchor metrics are below the third threshold (and above the first and second thresholds as determined in steps 1012 and 1016), the classifier can select a different prediction structure size or distance (M) defined for when the anchor metrics are below the third threshold. In this example, the prediction structure size or distance M at step 1018 is 4 (M=4). At step 1014, the classifier then selects long distance prediction with the prediction structure size or distance M=4.

As illustrated here, the prediction structure size or distance M at step 1018 is smaller than the prediction structure size or distance M at steps 1012 and 1016. The classifier here can determine based on the anchor metrics that the prediction structure size or distance should be smaller because, for example, the frame or frame content is less static or contains a higher number or frequency of scene changes than in cases where the classifier determines that the anchor metrics are below the first or second threshold in step 1012 or step 1016.

Thus, the anchor metrics and thresholds used in the multi-class decisions at steps 1012, 1016, and 1018 can indicate to the classifier certain characteristics of the frame, such as an amount of motion, an amount or frequency of scene changes, etc., which the classifier can use to fine-tune the prediction structure size or distance (M) of the long distance prediction structure selected at step 1014. This multi-class decision process can, in many cases, result in greater customization, flexibility, granularity, performance, etc.

The number of prediction structure size or distance options and the values of the prediction structure sizes or distances in FIG. 10 (i.e., M=16, M=8, and M=4) are non-limiting examples provided for illustrative and explanation purposes. It should be understood that in other examples, the flow 1000 may implement one or more of the same or different prediction structure sizes or distances and/or the same or a different number of prediction structure size or distance options than illustrated in FIG. 10. For example, the flow 1000 may include prediction structure size or distance selection steps determining whether to select prediction structure sizes or distances of M=18, M=10, M=3, etc.

Moreover, the anchor metrics and thresholds used in steps 1012, 1016, and 1018 can vary in different implementations. For example, in some cases, the anchor metrics may include feature vector ($x_i$). In other examples, the anchor metrics may include a predicted feature output (e.g., ŷ). In yet other examples, the anchor metrics may include $MV_{avg}$, IntraRatio, SkipRatio, and/or other feature values or statistics.

Figure 11:
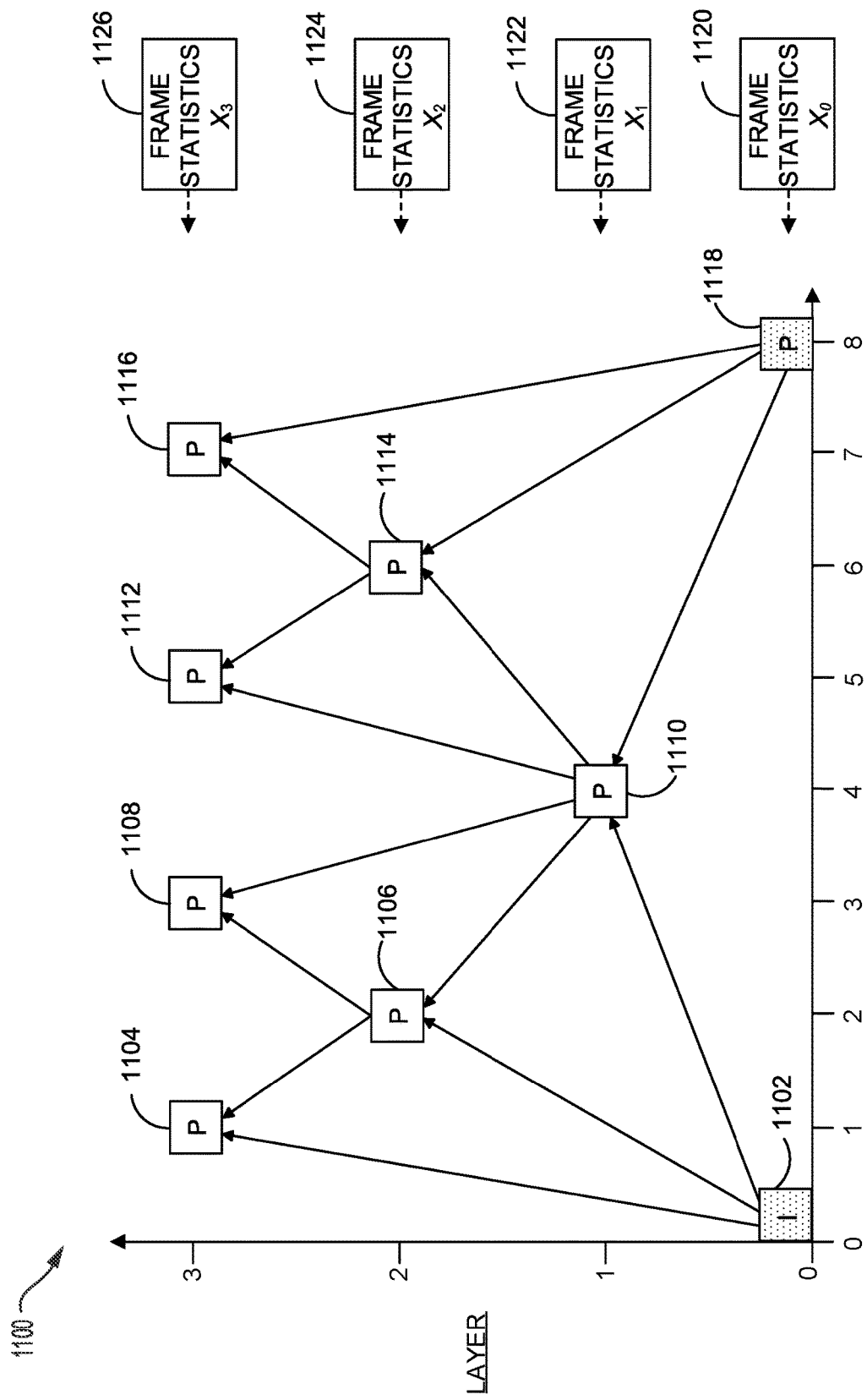
FIG. 11 illustrates an example configuration for estimating the characteristics of a sequence of frames based on multi-frame statistics, in accordance with some examples.

FIG. 11 illustrates an example configuration 1100 for estimating the characteristics of a sequence of frames based on multi-frame statistics 1120, 1122, 1124, 1126. The multi-frame statistics 1120, 1122, 1124, 1126 in this example are based on frames (1102-1118) in a random access prediction structure having multiple temporal layers (layers 0 through 3), also referred to as temporal sub-layers. Using multi-frame statistics as shown in FIG. 11 can, in some cases, increase the accuracy and/or stability of characteristics estimated for a video sequence. For example, in some cases, using statistics of only one frame, such as an anchor frame (e.g., frame 1102, frame 1118), may not be sufficiently accurate or stable for estimating the characteristics of a video sequence. Accordingly, in some implementations, as shown in FIG. 11, statistics from multiple frames within a prediction structure may be considered.

In the example configuration 1100, the multi-frame statistics 1120, 1122, 1124, 1126 include $x_0$ (1120), $x_1$ (1122), $x_2$ (1124), and $x_3$ (1126). Here, $x_0$ (1120) can represent statistics of frame 8 (1118) in layer 0; $x_1$ (1122) can represent statistics of frame 4 (1110) in layer 1; $x_2$ (1124) can represent the average statistics of frames 2 (1106) and 6 (1114) in layer 2; and $x_3$ (1126) can represent the average statistics of frame 1 (1102), frame 3 (1108), frame 5 (1112), and frame 7 (1116) in layer 3.

The multi-frame statistics 1120, 1122, 1124, 1126 can include, for example, one or more feature vectors, such as $MV_{avg}$, IntraRatio, SkipRatio, and/or other feature vectors or values. In one illustrative example, the multi-frame statistics 1120, 1122, 1124, 1126 can be calculated according to the following equation:

$$x = \Sigma_{i=0}^{n} w_i x_i \qquad \text{Equation 2,}$$

where $w_i$ represents one or more weights, and n represents the number of parameters (i). In some cases, the values of $w_i$ may be derived through linear regression. In other cases, the values of $w_i$ may be pre-defined based on a temporal layer value. For example, layer 0 (e.g., frame 8 (1118)) may be assigned a highest weight due to its higher importance in the prediction chain.

The multi-frame statistics 1120, 1122, 1124, 1126 can be calculated for use in making decisions for selecting prediction modes or structures or switching between prediction modes or structures, as illustrated in FIGS. 7A-B, 9A-B, and 10. For example, the multi-frame statistics 1120, 1122, 1124, 1126 can be used to compute feature vectors and/or predicted feature outputs for selecting a prediction mode or structure as previously described.

It should be noted that the prediction structure in the example configuration 1100 shown in FIG. 11 is one illustrative example of a prediction structure that may be used when estimating the characteristics of a sequence based on multi-frame statistics. The concepts and methods for estimating the characteristics of a sequence based on multi-frame statistics are also applicable to other long distance or short distance prediction structures, such as the example prediction structures 500 and 550 shown in FIGS. 5A and 5B.

In some cases, rate control can be implemented when encoding frames to reduce the number of coding bits used for a given frame and the size of the output frame while retaining as much quality as possible.

A rate control algorithm first allocates a bit budget to the frames or the coding units. The allocated bit budget for each is used to calculate the model parameters, which are then used to encode the video according to the target bit rate. The quantization step size can determine the degree of spatial detail retained in the video. A smaller quantization step size results in a larger amount of spatial detail retained and a higher bit rate, and vice versa. The QP is the parameter that regulates the quantization step size. The input to a rate control algorithm is generally a target bitrate for the video sequence to be encoded. The bits can be distributed at different levels of granularity depending on the rate control model. One important aspect of a rate control model is the rate distortion optimization. The parameters implemented by the rate control model typically aim to minimize distortion (D).

When rate control is enabled for a video sequence, one or more rate control models may be used for different prediction structures and/or different temporal layer frames (e.g., 1102-1118). For example, in some cases, different rate control models may be used for different prediction structures and/or different temporal layer frames (e.g., 1102-1118). However, in some cases, frames in different prediction structures may also share a same rate control model. For example, anchor frames in a short distance prediction structure (e.g., 500) may share the same rate control model with the anchor frames in a long distance prediction structure (e.g., 550).

The feature vectors used to select prediction structures in rate control implementations can include the various features previously described, such as $MV_{avg}$, IntraRatio, SkipRatio, etc., as well as other information such as the number of non-zeros (nnz) in the transform coefficients and the quantization parameter (QP).

Non-limiting examples of rate control models that may be implemented in rate control implementations include a Q domain model, a $\rho$ domain model, and $\lambda$ domain model. However, other rate control models may also be implemented.

The Q-domain models typically attempt to build a relationship between bitrate (R) and Quantization Q. For example, in a Q-domain model, bitrate (R) is fit linearly or quadratically to the QP, as illustrated in the equation below:

$$R(QP) = \frac{\alpha}{QP} \text{ or } R(QP) = \frac{\alpha}{QP} + \frac{b}{QP^2}. \qquad \text{Equation 3}$$

$\rho$-domain models attempt to model the relationship between $\rho$, e.g., the percentage of zeroes among quantized transform coefficients and the bitrate (R). In the $\rho$ domain model, which is often used for its simplicity, the rate (R) can be estimated by the following equation:

$$R = \theta(1-\rho) \qquad \text{Equation 4,}$$

where $\rho$ is the percentage of zeros among quantized transform coefficients, and $\theta$ is a parameter that depends on the QP. The QP may be identified from the updated $\rho$–QP table.

In $\lambda$-domain models, $\lambda$ is the slope of the R-D curve that has an accurate relationship with the number of bits to be used for encoding. In the $\lambda$-domain model, which is one of the most accurate models, the rate (R) is a function of $\lambda$ as illustrated in the following equation:

$$R = \alpha \lambda^\beta \qquad \text{Equation 5,}$$

where QP can be calculated by the following equation:

$$QP = c_1 \ln(\lambda) + c_2 \qquad \text{Equation 6.}$$

Having disclosed example systems and concepts, the disclosure now turns to the example method 1200 for encoding frames based on adaptive prediction structures, as shown in FIG. 12. For the sake of clarity, the method 1200 is described with reference to the encoding device 104, as shown in FIG. 1, configured to perform the various steps in the method 1200. The steps outlined herein are examples and can be implemented in any combination thereof, including combinations that exclude, add, or modify certain steps.

At step 1202, the encoding device 104 obtains a sequence of frames for encoding. The sequence of frames can include frames captured and/or obtained from a video source (e.g., 102), such as a camera, a smartphone, a laptop or tablet computer, a server, a smart device, etc.

At step 1204, the encoding device 104 determines (e.g., using a classifier), based on frame statistics (e.g., a predicted feature output, a feature vector, frame characteristics) associated with a first frame in the sequence of frames, a prediction structure (e.g., 500, 550) for encoding the sequence of frames. The prediction structure can define an order in which frames in the sequence are encoded and a prediction distance (M) representing a maximum distance permitted between referencing frames (e.g., a current frame)

and reference frames (e.g., reference frame(s) used by a current frame) in the sequence.

The frame statistics can indicate an amount of motion in the first frame, a type of content in the first frame, and/or any other characteristics of the first frame and/or its associated content. For example, the frame statistics can include a predicted feature output (e.g., $\hat{y}$), a feature vector (e.g., $x_i$), a $MV_{avg}$, an IntraRatio value, a SkipRatio value, the number of non-zeros in the transform coefficients and the QP, and/or any other features associated with the first frame. In some cases, the frame statistics used at step 1204 can also be associated with one or more other frames. For example, the frame statistics can include multi-frame statistics (e.g., 1120, 1122, 1124, 1126) as shown in FIG. 11.

The prediction structure can include, for example, a short distance prediction structure (e.g., 500) or a long distance prediction structure (e.g., 550), depending on the characteristics of the first frame as reflected in the frame statistics. The prediction distance (M) can increase or decrease based on the characteristics of the first frame as reflected by the frame statistics, such as the amount of motion in the first frame, the type of content in the first frame, the amount or frequency of scene changes in the first frame, etc. For example, if the frame statistics indicate that the first frame is static or has static content, a long (or longer) prediction distance (e.g., M=6, M=8, M=12, etc.) can be selected for the prediction structure. On the other hand, if the frame statistics indicate that the first frame has a lot of motion (e.g., above a threshold), the content in the first frame is of a particular type such as screen content, or the frame reflects a rapid scene change, a short (or shorter) prediction distance (e.g., M=1, M=2, etc.) can be selected for the prediction structure.

In some cases, determining the prediction structure can include selecting (e.g., using a classifier) a prediction mode for encoding the sequence of frames. The prediction mode can include a short prediction mode or a long prediction mode, as previously described. The short prediction mode can be selected when the amount of motion in the first frame is below a threshold or the first frame includes screen content, and the long prediction mode can be selected when the amount of motion in the first frame is above the threshold and the first frame does not include screen content.

In some cases, a content classifier can process the first frame and determine whether the content in the first frame includes screen content. This determination can then be used in selecting the prediction mode for encoding the sequence of frames. For example, if the first frame includes screen content, the prediction structure selected can be a short (or shorter) prediction structure as previously described.

At step 1206, the encoding device 104 encodes one or more of the sequence of frames based on the prediction structure. The encoding device 104 can encode frames in the sequence based on one or more frames in the prediction structure, the order defined in the prediction structure for encoding frames in the sequence, the prediction distance (M) in the prediction structure, etc.

In some cases, a classifier can determine whether to switch to a different prediction structure at another location in the sequence (e.g., another frame in the sequence). For example, the classifier can calculate frame statistics for a different frame in the sequence and, based on the frame statistics, determine whether to continue using the prediction structure from step 1204 or switch to a different prediction structure, such as a prediction structure with a shorter or longer prediction distance, a higher or lower amount of anchor frames, a different configuration, etc. If the classifier decides to switch to the different prediction structure, the encoding device 104 can implement the different prediction structure to encode the different frame and/or any other subsequent frames until a decision to switch to another prediction structure is made (if at all).

In some examples, the encoding device 104 can obtain an additional sequence of frames. A classifier can then determine, based on additional frame statistics associated with a current frame in the additional sequence of frames, whether to use the prediction structure for the additional sequence of frames or a different prediction structure. For example, the classifier can decide to switch to a different prediction structure for encoding the additional sequence of frames. The different prediction structure can define a different order for encoding frames in the additional sequence of frames and a different prediction distance for the different prediction structure. The encoding device 104 can then use the different prediction structure to encode the current frame and/or any other frames in the additional sequence of frames.

In some cases, the prediction distance of the different prediction structure can be smaller than the prediction distance of the prediction structure calculated at step 1204 when the amount of motion in the current frame of the additional sequence of frames is greater than the amount of motion in the first frame in the sequence of frames obtained at step 1202. In other cases, the prediction distance of the different prediction structure can be larger than the prediction distance of the prediction structure calculated at step 1204 when the amount of motion in the current frame of the additional sequence of frames is less than the amount of motion in the first frame in the sequence of frames obtained at step 1202.

In some cases, the method 1200 can include calculating a first feature vector (e.g., $x_1$) representing the amount of motion in the first frame, and a second feature vector (e.g., $x_i$) representing the amount of motion in the current frame of the additional sequence of frames. The method 1200 can further include determining (e.g., using a classifier), based on a predicted feature output (e.g., $\hat{y}$) computed from the first feature vector, the prediction structure for encoding the sequence of frames obtained at step 1202 and a size or prediction distance of the prediction structure calculated for the sequence of frames. Similarly, the method 1200 can include determining (e.g., using a classifier), based on a second predicted feature output (e.g., $\hat{y}$) computed from the second feature vector, the different prediction structure for encoding the additional sequence of frames and a size or prediction distance for the different prediction structure.

In some cases, the first feature vector can be calculated based on a motion vector calculated for the first frame. The motion vector can be calculated, for example, by averaging motion vectors calculated for blocks in the first frame. Similarly, the second feature vector can be calculated based on a motion vector calculated for the current frame in the additional sequence of frames. The motion vector for the current frame in the additional sequence of frames can be calculated, for example, by averaging motion vectors calculated for multiple blocks in the current frame in the additional sequence of frames.

Once the encoding device 104 has encoded the one or more sequences of frames based on the prediction structure, the encoding device 104 can store the resulting encoded video bitstream data (e.g., the encoded one or more sequences of frames) and/or provide the encoded video bitstream data to a decoder tool or device for decoding and/or rendering. For example, the encoding device 104 can provide the encoded video bitstream data to the decoding device 112 shown in FIG. 1. The decoding device 112 can receive the encoded video bitstream data and decode it for rendering at a display device. In some examples, the decoding device 112 can decode the encoded video bitstream data by entropy decoding and extracting the elements of one or more sequences of frames making up the encoded video bitstream data, as further described with reference to FIG. 1.

In some cases, the decoding device 112 may rescale and perform an inverse transform on the encoded video bitstream data. Residual data is then passed to a prediction stage of the decoder engine (e.g., 116) associated with the decoding device 112. The decoding device 112 then predicts a block of pixels (e.g., a PU). In some examples, the prediction is added to the output of the inverse transform (the residual data).

After decoding the encoded video bitstream data, the decoding device 112 may output the decoded video data to a display device (e.g., video destination device 122) for rendering or playback. The display device can receive the decoded video data and render or display the decoded video data to a consumer of the content.

The disclosure now turns to FIGS. 13 and 14, which illustrate example details of the encoding device 104 and the decoding device 112, respectively. FIG. 13 is a block diagram illustrating an example configuration of the encoding device 104, which may implement one or more of the techniques described in this disclosure. Encoding device 104 may, for example, encode frames using the adaptive prediction modes or structures described herein. Moreover, encoding device 104 may perform intra-prediction and inter-prediction coding of video blocks within video slices or frames. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 1302, prediction processing unit 1304, filter unit 1316, picture memory 1318, summer 1306, transform processing unit 1320, quantization unit 1322, and entropy encoding unit 1324. Prediction processing unit 1304 includes motion estimation unit 1312, motion compensation unit 1314, and intra-prediction processing unit 1310. For video block reconstruction, encoding device 104 also includes inverse quantization unit 1326, inverse transform processing unit 1328, and summer 1308. Filter unit 1316 is intended to represent one or more loop filters such as a deblocking filter, an adaptive loop filter (ALF), and a sample adaptive offset (SAO) filter. Although filter unit 1316 is shown in FIG. 13 as being an in loop filter, in other configurations, filter unit 1316 may be implemented as a post loop filter. A post processing device 1330 may perform additional processing on encoded video data generated by the encoding device 104. The techniques of this disclosure may in some instances be implemented by the encoding device 104. In other instances, however, one or more of the techniques of this disclosure may be implemented by post processing device 1330.

As shown in FIG. 13, the encoding device 104 receives video data, and partitioning unit 1302 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 1304 may select one or more coding modes, such as one or more short distance prediction modes or structures (e.g., 500), long distance prediction modes or structures (e.g., 550), intra-prediction coding modes, inter-prediction coding modes, etc., for the current video block based on error results (e.g., coding rate and the level of distortion, or the like). Prediction processing unit 1304 may implement a classifier to select coding modes and implement prediction mode switching decisions as previously described. Prediction processing unit 1304 may provide the resulting intra- or inter-coded block to summer 1306 to generate residual block data and to summer 1308 to reconstruct the encoded block for use as a reference picture.

Intra-prediction processing unit 1310 within prediction processing unit 1304 may perform intra-prediction coding of the current video block relative to one or more neighboring blocks in the same frame or slice as the current block to be coded to provide spatial compression. Motion estimation unit 1312 and motion compensation unit 1314 within prediction processing unit 1304 perform inter-predictive coding of the current video block relative to one or more predictive blocks in one or more reference pictures to provide temporal compression.

Motion estimation unit 1312 may be configured to determine the inter-prediction mode for a video slice according to a predetermined pattern for a video sequence. The predetermined pattern may designate video slices in the sequence as P slices, B slices, or GPB slices. Motion estimation unit 1312 and motion compensation unit 1314 may be highly integrated, but are illustrated separately for conceptual purposes. Motion estimation, performed by motion estimation unit 1312, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 1318. For example, the encoding device 104 may interpolate values of one-quarter pixel positions, one-eighth pixel positions, or other fractional pixel positions of the reference picture. Therefore, motion estimation unit 1312 may perform a motion search relative to the full pixel positions and fractional pixel positions and output a motion vector with fractional pixel precision.

Motion estimation unit 1312 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 1318. Motion estimation unit 1312 sends the calculated motion vector to entropy encoding unit 1324 and motion compensation unit 1314.

Motion compensation, performed by motion compensation unit 1314, may involve fetching or generating the predictive block based on the motion vector determined by motion estimation, possibly performing interpolations to sub-pixel precision. Upon receiving the motion vector for the PU of the current video block, motion compensation unit 1314 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 1306 represents the component or components that perform this subtraction operation. Motion compensation unit 1314 may also generate syntax elements associated with the video blocks and the video slice for use by the decoding device 112 in decoding the video blocks of the video slice.

Intra-prediction processing unit 1310 may intra-predict a current block, as an alternative to the inter-prediction performed by motion estimation unit 1312 and motion compensation unit 1314, as described above. In particular, intra-prediction processing unit 1310 may determine an intra-prediction mode to use to encode a current block. In some examples, intra-prediction processing unit 1310 may encode a current block using various intra-prediction modes or prediction structures, e.g., during separate encoding passes, and intra-prediction processing unit 1310 (or a mode select unit, in some examples) may select an appropriate intra-prediction mode or prediction structure to use from the tested modes. For example, intra-prediction processing unit 1310 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 1310 may calculate ratios from the distortions and rates for the various encoded blocks to determine which intra-prediction mode exhibits the best rate-distortion value for the block.

In any case, after selecting an intra-prediction mode for a block, intra-prediction processing unit 1310 may provide information indicative of the selected intra-prediction mode for the block to entropy encoding unit 1324. Entropy encoding unit 1324 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include intra-prediction mode index tables and modified intra-prediction mode index tables (also referred to as codeword mapping tables).

After prediction processing unit 1304 generates the predictive block for the current video block via inter-prediction or intra-prediction, the encoding device 104 forms a residual video block by subtracting the predictive block from the current video block. The residual video data in the residual block may be included in one or more TUs and applied to transform processing unit 1320. Transform processing unit 1320 transforms the residual video data into residual transform coefficients using a transform, such as a discrete cosine transform (DCT) or a conceptually similar transform. Transform processing unit 1320 may convert the residual video data from a pixel domain to a transform domain, such as a frequency domain.

Transform processing unit 1320 may send the resulting transform coefficients to quantization unit 1322. Quantization unit 1322 quantizes the transform coefficients to further reduce bit rate. The quantization process may reduce the bit depth associated with some or all of the coefficients. The degree of quantization may be modified by adjusting a quantization parameter. In some examples, quantization unit 1322 may then perform a scan of the matrix including the quantized transform coefficients. Alternatively, entropy encoding unit 1324 may perform the scan.

Following quantization, entropy encoding unit 1324 entropy encodes the quantized transform coefficients. For example, entropy encoding unit 1324 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 1324, the encoded bitstream may be transmitted to the decoding device 112, or archived for later transmission or retrieval by the decoding device 112. Entropy encoding unit 1324 may also entropy encode the motion vectors and the other syntax elements for the current video slice being coded.

Inverse quantization unit 1326 and inverse transform processing unit 1328 apply inverse quantization and inverse transformation, respectively, to reconstruct the residual block in the pixel domain for later use as a reference block of a reference picture. Motion compensation unit 1314 may calculate a reference block by adding the residual block to a predictive block of one of the reference pictures within a reference picture list. Motion compensation unit 1314 may also apply one or more interpolation filters to the reconstructed residual block to calculate sub-integer pixel values for use in motion estimation. Summer 1308 adds the reconstructed residual block to the motion compensated prediction block produced by motion compensation unit 1314 to produce a reference block for storage in picture memory 1318. The reference block may be used by motion estimation unit 1312 and motion compensation unit 1314 as a reference block to inter-predict a block in a subsequent video frame or picture.

In this manner, the encoding device 104 of FIG. 13 represents an example of a video encoder configured to generate syntax for a encoded video bitstream. The encoding device 104 may, for example, generate VPS, SPS, and PPS parameter sets as described above. The encoding device 104 may perform any of the techniques described herein, including any of the processes or techniques described above with respect to FIGS. 5A through 12. The techniques of this disclosure have generally been described with respect to the encoding device 104, but as mentioned above, some of the techniques of this disclosure may also be implemented by post processing device 1330.

FIG. 14 is a block diagram illustrating an example decoding device 112. The decoding device 112 includes an entropy decoding unit 1404, prediction processing unit 1408, inverse quantization unit 1406, inverse transform processing unit 1418, summer 1420, filter unit 1416, and picture memory 1414. Prediction processing unit 1408 includes motion compensation unit 1410 and intra prediction processing unit 1412. The decoding device 112 may, in some examples, perform a decoding pass generally reciprocal to the encoding pass described with respect to the encoding device 104 from FIG. 13.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 1402, such as a server, a media-aware network element (MANE), a video editor/splicer, or other such device configured to implement one or more of the techniques described above. Network entity 1402 may or may not include the encoding device 104. Some of the techniques described in this disclosure may be implemented by network entity 1402 prior to network entity 1402 transmitting the encoded video bitstream to the decoding device 112. In some video decoding systems, network entity 1402 and the decoding device 112 may be parts of separate devices, while in other instances, the functionality described with respect to network entity 1402 may be performed by the same device as the decoding device 112.

The entropy decoding unit 1404 of the decoding device 112 entropy decodes the bitstream to generate quantized coefficients, motion vectors, and other syntax elements. Entropy decoding unit 1404 forwards the motion vectors and other syntax elements to prediction processing unit 1408. The decoding device 112 may receive the syntax elements at the video slice level and/or the video block level. Entropy decoding unit 1404 may process and parse both fixed-length syntax elements and variable-length syntax elements in or more parameter sets, such as a VPS, SPS, and PPS.

When the video slice is coded as an intra-coded (I) slice, intra prediction processing unit 1412 of prediction processing unit 1408 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 1410 of prediction processing unit 1408 produces predictive blocks for a video block of the current video slice based on the motion vectors and other syntax elements received from entropy decoding unit 1404. The predictive blocks may be produced from one of the reference pictures within a reference picture list. The decoding device 112 may construct the reference frame lists, List 0 and List 1, using default construction techniques based on reference pictures stored in picture memory 1414.

Motion compensation unit 1410 determines prediction information for a video block of the current video slice by parsing the motion vectors and other syntax elements, and uses the prediction information to produce the predictive blocks for the current video block being decoded. For example, motion compensation unit 1410 may use one or more syntax elements in a parameter set to determine a prediction mode (e.g., intra- or inter-prediction) used to code the video blocks of the video slice, an inter-prediction slice type (e.g., I slice, B slice, P slice, GPB slice, etc.), construction information for one or more reference picture lists for the slice, motion vectors for each inter-encoded video block of the slice, inter-prediction status for each inter-coded video block of the slice, and other information to decode the video blocks in the current video slice.

Motion compensation unit 1410 may also perform interpolation based on interpolation filters. Motion compensation unit 1410 may use interpolation filters as used by the encoding device 104 during encoding of the video blocks to calculate interpolated values for sub-integer pixels of reference blocks. In this case, motion compensation unit 1410 may determine the interpolation filters used by the encoding device 104 from the received syntax elements, and may use the interpolation filters to produce predictive blocks.

Inverse quantization unit 1406 inverse quantizes, or dequantizes, the quantized transform coefficients provided in the bitstream and decoded by entropy decoding unit 1404. The inverse quantization process may include use of a quantization parameter calculated by the encoding device 104 for each video block in the video slice to determine a degree of quantization and, likewise, a degree of inverse quantization that should be applied. Inverse transform processing unit 1418 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 1410 generates the predictive block for the current video block based on the motion vectors and other syntax elements, the decoding device 112 forms a decoded video block by summing the residual blocks from inverse transform processing unit 1418 with the corresponding predictive blocks generated by motion compensation unit 1410. Summer 1420 represents the component or components that perform this summation operation. If desired, loop filters (either in the coding loop or after the coding loop) may also be used to smooth pixel transitions, or to otherwise improve the video quality. Filter unit 1416 is intended to represent one or more loop filters such as a deblocking filter, an adaptive loop filter (ALF), and a sample adaptive offset (SAO) filter. Although filter unit 1416 is shown in FIG. 14 as being an in loop filter, in other configurations, filter unit 1416 may be implemented as a post loop filter. The decoded video blocks in a given frame or picture are then stored in picture memory 1414, which stores reference pictures used for subsequent motion compensation. Picture memory 1414 also stores decoded video for later presentation on a display device, such as video destination device 122 shown in FIG. 1.

In the foregoing description, aspects of the application are described with reference to specific examples thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Claim language reciting "at least one of" a set indicates that one member of the set or multiple members of the set satisfy the claim. For example, claim language reciting "at least one of A and B" means A, B, or A and B.

What is claimed is:

1. A method of encoding frames, the method comprising:
   obtaining a sequence of frames at an encoder;
   determining frame statistics associated with a first frame in the sequence of frames;
   determining, based on the determined frame statistics associated with the first frame in the sequence of frames, to change from a first prediction structure currently being used to a second prediction structure for encoding one or more frames that occur later in coding order in the sequence of frames than the first frame, the second prediction structure defining an order in which frames in the sequence of frames are encoded and a prediction distance representing a maximum distance permitted between any referencing frames and reference frames available for reference by the referencing frames when performing inter-prediction, the prediction distance defined by the second prediction structure being different than a prediction distance defined by the first prediction structure; and
   encoding the one or more frames based on the second prediction structure.

2. The method of claim 1, further comprising:
   obtaining an additional sequence of frames at the encoder;
   determining, based on additional frame statistics associated with a second frame in the additional sequence of frames, a different prediction structure for encoding the additional sequence of frames, the different prediction structure defining a different order in which frames in the additional sequence of frames are encoded and a different prediction distance representing a different maximum distance permitted between referencing frames and reference frames in the additional sequence of frames; and
   encoding one or more of the additional sequence of frames based on the different prediction structure.

3. The method of claim 2, wherein the frame statistics indicate an amount of motion in the first frame and the additional frame statistics indicate an amount of motion in the second frame, wherein the prediction distance defined by the second prediction structure is smaller than the different prediction distance when the amount of motion in the first frame is greater than the amount of motion in the second frame, and wherein the prediction distance defined by the second prediction structure is larger than the different prediction distance when the amount of motion in the first frame is less than the amount of motion in the second frame.

4. The method of claim 2, further comprising:
   calculating a first feature vector representing an amount of motion in the first frame, the first feature vector being calculated based on at least one of a first respective motion vector computed for the first frame, a first respective intra ratio computed for the first frame, a first respective skip ratio computed for the first frame, a weight, and a bias value; and
   calculating a second feature vector representing an amount of motion in the second frame, the second feature vector being calculated based on at least one of a second respective motion vector computed for the second frame, a second respective intra ratio computed for the second frame, a second respective skip ratio computed for the second frame, the weight, and the bias value.

5. The method of claim 4, further comprising:
based on the first feature vector, determining, using a classifier, at least one of the second prediction structure for encoding the one or more frames and a first respective size of the prediction distance defined by the second prediction structure, the classifier comprising one of a linear classifier or a decision tree classifier; and
based on the second feature vector, determining, using the classifier, at least one of the different prediction structure for encoding the additional sequence of frames and a second respective size of the different prediction distance.

6. The method of claim 4, further comprising:
calculating a training feature vector for at least one frame in a sample sequence of frames;
adjusting, based on an accuracy or error associated with the training feature vector, at least one of a respective weight and a respective bias value used to calculate the training feature vector to generate a trained weight and a trained bias value; and
using the trained weight and the trained bias value to determine the weight and the bias value associated with the first feature vector and the second feature vector.

7. The method of claim 4, wherein the first respective intra ratio comprises a first percentage of pixels coded in the first frame by intra prediction and the second respective intra ratio comprises a second percentage of pixels coded in the second frame by intra prediction, wherein the first respective skip ratio comprises a third percentage of pixels coded by skip mode from among the pixels coded in the first frame by intra prediction, and wherein the second respective skip ratio comprises a fourth percentage of pixels coded by skip mode from among the pixels coded in the second frame by intra prediction.

8. The method of claim 4, wherein the first respective motion vector is calculated at least partly by averaging a first set of motion vectors corresponding to a first plurality of blocks in the first frame, and wherein the second respective motion vector is calculated at least partly by averaging a second set of motion vectors corresponding to a second plurality of blocks in the second frame.

9. The method of claim 1, wherein determining to change from the first prediction structure to the second prediction structure comprises:
selecting, based on respective frame statistics associated with at least one frame from the sequence of frames, a prediction mode for encoding operations associated with the sequence of frames, the prediction mode comprising a short prediction mode or a long prediction mode, wherein the respective frame statistics comprise a respective amount of motion calculated for the at least one frame, wherein the short prediction mode is selected when an amount of motion in the first frame is below a threshold or a type of content in the first frame comprises screen content, and wherein the long prediction mode is selected when the amount of motion in the first frame is above the threshold.

10. The method of claim 9, further comprising:
processing the first frame using a content classifier; and
determining, based on an output from the content classifier, that the type of content in the first frame comprises screen content.

11. The method of claim 9, wherein the prediction mode comprises the short prediction mode and the second prediction structure is associated with the short prediction mode, the method further comprising:
when processing a frame from the sequence of frames, determining whether to switch to the long prediction mode and change the second prediction structure to a long distance prediction structure having a longer prediction distance than the prediction distance defined by the second prediction structure; and
in response to determining to switch to the long prediction mode and change the second prediction structure to the long distance prediction structure, encoding the frame from the sequence of frames based on the long prediction mode and the long distance prediction structure.

12. The method of claim 9, wherein the prediction mode comprises the long prediction mode and the second prediction structure is associated with the long prediction mode, the method further comprising:
for each anchor frame in the sequence of frames that is processed while the long prediction mode is selected, determining whether to switch to the short prediction mode and a short distance prediction structure having a shorter prediction distance than the prediction distance defined by the second prediction structure; and
in response to determining to switch to the short prediction mode and change the second prediction structure to the short distance prediction structure, encoding a frame from the sequence of frames based on the short prediction mode and the short distance prediction structure.

13. The method of claim 1, wherein encoding the one or more frames is further based on a respective rate control model selected for each frame, the respective rate control model comprising a q-domain model, a p-domain model, or a $\lambda$-domain model.

14. An apparatus for encoding frames, the apparatus comprising:
memory configured to store data; and
one or more processors configured to:
obtain a sequence of frames;
determine frame statistics associated with a first frame in the sequence of frames;
determine, based on the determined frame statistics associated with the first frame in the sequence of frames, to change from a first prediction structure currently being used to a second prediction structure for encoding one or more frames that occur later in coding order in the sequence of frames than the first frame, the second prediction structure defining an order in which frames in the sequence of frames are encoded and a prediction distance representing a maximum distance permitted between any referencing frames and reference frames available for reference by the referencing frames when performing inter-prediction, the prediction distance defined by the second prediction structure being different than a prediction distance defined by the first prediction structure; and
encode the one or more frames based on the second prediction structure.

15. The apparatus of claim 14, wherein the one or more processors are further configured to:
obtain an additional sequence of frames;
determine, based on additional frame statistics associated with a second frame in the additional sequence of frames, a different prediction structure for encoding the additional sequence of frames, the different prediction structure defining a different order in which frames in the additional sequence of frames are encoded and a different prediction distance representing a different maximum distance permitted between referencing frames and referenced frames in the additional sequence of frames; and encode one or more of the additional sequence of frames based on the different prediction structure.

16. The apparatus of claim 15, wherein the frame statistics indicate an amount of motion in the first frame and the additional frame statistics indicate an amount of motion in the second frame, wherein the prediction distance defined by the second prediction structure is smaller than the different prediction distance when the amount of motion in the first frame is greater than the amount of motion in the second frame, and wherein the prediction distance defined by the second prediction structure is larger than the different prediction distance when the amount of motion in the first frame is less than the amount of motion in the second frame.

17. The apparatus of claim 15, wherein the one or more processors are further configured to:

calculate a first feature vector representing an amount of motion in the first frame, the first feature vector being calculated based on at least one of a first respective motion vector computed for the first frame, a first respective intra ratio computed for the first frame, a first respective skip ratio computed for the first frame, a weight, and a bias value; and calculate a second feature vector representing an amount of motion in the second frame, the second feature vector being calculated based on at least one of a second respective motion vector computed for the second frame, a second respective intra ratio computed for the second frame, a second respective skip ratio computed for the second frame, the weight, and the bias value.

18. The apparatus of claim 17, wherein the one or more processors are further configured to:

based on the first feature vector, determine, using a classifier, at least one of the second prediction structure for encoding the one or more frames and a first respective size of the prediction distance defined by the second prediction structure, the classifier comprising one of a linear classifier or a decision tree classifier; and based on the second feature vector, determine, using the classifier, at least one of the different prediction structure for encoding the additional sequence of frames and a second respective size of the different prediction distance.

19. The apparatus of claim 17, wherein the one or more processors are further configured to:

calculate a training feature vector for at least one frame in a sample sequence of frames;

adjust, based on an accuracy or error associated with the training feature vector, at least one of a respective weight and a respective bias value used to calculate the training feature vector to generate a trained weight and a trained bias value; and determine, based on the trained weight and the trained bias value, the weight and the bias value associated with the first feature vector and the second feature vector.

20. The apparatus of claim 17, wherein the first respective intra ratio comprises a first percentage of pixels coded in the first frame by intra prediction and the second respective intra ratio comprises a second percentage of pixels coded in the second frame by intra prediction, wherein the first respective skip ratio comprises a third percentage of pixels coded by skip mode from among the pixels coded in the first frame by intra prediction, and wherein the second respective skip ratio comprises a fourth percentage of pixels coded by skip mode from among the pixels coded in the second frame by intra prediction.

21. The apparatus of claim 17, wherein the first respective motion vector is calculated at least partly by averaging a first set of motion vectors corresponding to a first plurality of blocks in the first frame, and wherein the second respective motion vector is calculated at least partly by averaging a second set of motion vectors corresponding to a second plurality of blocks in the second frame.

22. The apparatus of claim 14, wherein determining to change from the first prediction structure to the second prediction structure comprises:

selecting, based on respective frame statistics associated with at least one frame from the sequence of frames, a prediction mode for encoding operations associated with the sequence of frames, the prediction mode comprising a short prediction mode or a long prediction mode, wherein the respective frame statistics comprise a respective amount of motion calculated for the at least one frame, wherein the short prediction mode is selected when an amount of motion in the first frame is below a threshold or a type of content in the first frame comprises screen content, and wherein the long prediction mode is selected when the amount of motion in the first frame is above the threshold.

23. The apparatus of claim 22, wherein the one or more processors are further configured to:

process the first frame using a content classifier; and determine, based on an output from the content classifier, that the type of content in the first frame comprises screen content.

24. The apparatus of claim 22, wherein the prediction mode comprises the short prediction mode and the second prediction structure is associated with the short prediction mode, wherein the one or more processors are further configured to:

when processing a frame from the sequence of frames, determine whether to switch to the long prediction mode and change the second prediction structure to a long distance prediction structure having a longer prediction distance than the prediction distance defined by the second prediction structure; and in response to determining to switch to the long prediction mode and change the second prediction structure to the long distance prediction structure, encode the frame from the sequence of frames based on the long prediction mode and the long distance prediction structure.

25. The apparatus of claim 22, wherein the prediction mode comprises the long prediction mode and the second prediction structure is associated with the long prediction mode, wherein the one or more processors are further configured to:

for each anchor frame in the sequence of frames that is processed while the long prediction mode is selected, determine whether to switch to the short prediction mode and a short distance prediction structure having a shorter prediction distance than the prediction distance defined by the second prediction structure; and in response to determining to switch to the short prediction mode and change the second prediction structure to the short distance prediction structure, encode a frame from the sequence of frames based on the short prediction mode and the short distance prediction structure.

26. The apparatus of claim 14, wherein encoding the one or more frames is further based on a respective rate control model selected for each frame, the respective rate control model comprising a q-domain model, a p-domain model, or a λ-domain model.

27. The apparatus of claim 14, further comprising a mobile device.

28. The apparatus of claim 14, further comprising a display for displaying one or more frames.

29. The apparatus of claim 14, further comprising an encoding device.

30. A non-transitory computer-readable storage medium for encoding frames, the non-transitory computer-readable storage medium comprising instructions stored thereon which, when executed by one or more processors, cause the one or more processors to:

obtain a sequence of frames;

determine frame statistics associated with a first frame in the sequence of frames;

determine, based on the determined frame statistics associated with the first frame in the sequence of frames, to change from a first prediction structure currently being used to a second prediction structure for encoding one or more frames that occur later in coding order in the sequence of frames than the first frame, the second prediction structure defining an order in which frames in the sequence of frames are encoded and a prediction distance representing a maximum distance permitted between any referencing frames and reference frames available for reference by the referencing frames when performing inter-prediction, the prediction distance defined by the second prediction structure being different than a prediction distance defined by the first prediction structure; and encode the one or more frames based on the second prediction structure.

\* \* \* \* \*